(12) United States Patent
Furuse et al.

(10) Patent No.: US 6,182,501 B1
(45) Date of Patent: Feb. 6, 2001

(54) LEAK TEST METHOD AND APPARATUS

(75) Inventors: Akio Furuse, Hachioji; Hiroshi Horikawa, Toyota; Masayuki Nakagomi, Higashiyamato, all of (JP)

(73) Assignee: Cosmo Instruments, Co., Ltd., Tokyo (JP)

( * ) Notice: Under 35 U.S.C. 154(b), the term of this patent shall be extended for 0 days.

(21) Appl. No.: 09/172,866

(22) Filed: Oct. 15, 1998

(30) Foreign Application Priority Data

Oct. 21, 1997 (JP) .................................................. 9-288315

(51) Int. Cl.$^7$ ........................................................ G01M 3/26
(52) U.S. Cl. .............................................. 73/49.2; 73/49.3
(58) Field of Search ..................................... 73/49.2, 49.3

(56) References Cited

U.S. PATENT DOCUMENTS

| | | | |
|---|---|---|---|
| 4,571,986 | * 2/1986 | Fujii et al. | 73/49.3 X |
| 4,675,834 | * 6/1987 | Furuse | 73/49.2 X |
| 4,686,638 | * 8/1987 | Furuse | 73/49.2 X |
| 4,811,252 | * 3/1989 | Furuse | 73/49.2 X |
| 4,947,352 | * 8/1990 | Jenkins | 73/49.2 X |
| 4,993,256 | * 2/1991 | Fukuda | 73/49.2 |
| 5,367,797 | * 11/1994 | Zaim | 73/49.2 |

FOREIGN PATENT DOCUMENTS

| | | | |
|---|---|---|---|
| 61-82138 | * 4/1986 | (JP) | 73/49.2 |
| 6-194257 | * 7/1994 | (JP) | 73/49.2 |

* cited by examiner

*Primary Examiner*—Daniel S. Larkin
(74) *Attorney, Agent, or Firm*—Pollock, Vande Sande & Amernick

(57) ABSTRACT

In a leak test method and apparatus which introduces high-pressure gas into a work and a master from a high-pressure gas source through first and second electromagnetic valves, respectively, closes the first and second electromagnetic valves, detects the pressure difference between the work and the master by a differential pressure sensor, and compares the amount of leakage, obtained from the pressure difference, with a leakage reference value to thereby decides the work to be leak-free or leaky, a third electromagnetic valve is provided which permits and inhibits the passage of gas between the work and the master. Prior to measuring pressure difference variations in a measurement period and a stabilization period, the third electromagnetic valve is opened to establish a pressure equilibrium between the work and the master, then the electromagnetic valve is closed, then measures the pressure difference variations, and a last pressure difference variation $\delta p_e$ is subtracted from an initial pressure difference variation $\delta p_s$ to obtain the amount of drift.

16 Claims, 21 Drawing Sheets

FIG. 15A

| | 300 |
|---|---|
| 1 | $P_{d1}$ |
| 2 | $P_{d2}$ |
| 3 | $P_{d3}$ |
| ≈ | ≈ |
| m | $P_{dm}$ |

FIG. 15B

| | 300 |
|---|---|
| 1 | $P_{d2}$ |
| 2 | $P_{d3}$ |
| 3 | $P_{d4}$ |
| ≈ | ≈ |
| m | $P_{dm+1}$ |

| TYPES OF WORKS | 18°C | 20°C | 22°C | 24°C | 26°C | 28°C | ... |
|---|---|---|---|---|---|---|---|
| W1 | $P_d$ | - | - | - | | | |
| W2 | . | | | | | | |
| W3 | . | | | | | | |
| ⋮ | . | | | | | | |

LEAK TEST METHOD AND APPARATUS

BACKGROUND OF THE INVENTION

The present invention relates to a leak test method and apparatus which are used to check various containers or vessels for leaks.

In the manufacture of products or parts required to be free of leaks, it is general practice in the prior art to inspect them in succession on production lines and compare the inspection data with preset reference values to determine if they are leak-free or not. With the conventional method, products under test for leaks (hereinafter referred to as works), such as vessels or containers, are tested successively on production lines by introducing thereinto compressed gas and making a check to see if the compressed gas leaks out thereof or if the amount of leakage is smaller than a reference value. A leak testing apparatus that has been used in the past is a differential pressure type leak tester that detects leaks of the compressed gas from the work based on variations in the pressure difference between a master tank (hereinafter referred to as a master) and the work.

Referring now to FIGS. 1 and 2, the differential pressure type leak tester will be described in brief. FIG. 1 is a piping diagram of a prior art example and FIG. 2 a graph showing how the abovementioned pressure difference changes with the lapse of time.

In FIG. 1, a pressurized gas source 10 is piped via a pressure regulation valve 12 and a three-way electromagnetic valve 14 to electromagnetic valves 16W and 16M leading to a work 22W and a master 22M, respectively. Connected between the work 22W and the master 22M is a differential pressure sensor 18. The three-way electromagnetic valve 14 normally vents the conduits on both its sodes to the atmospheric pressure, but in response to a drive voltage, conducts both the conduits to each other.

The actual leak test starts with opening the valves 12, 14, 16W, and 16M to introduce pressurized gas into the work 22W and the master 22M from the pressurized gas source 10, followed by regulating the regulation valve 12 to set a pressure gauge 13 at a desired testing pressure. Next, the electromagnetic valves 16W and 16M are closed and after a certain elapsed time the pressure difference between the work 22W and the master 22M is measured by the differential pressure sensor 18. If the work 22W leaks, the pressure on the work side becomes gradually lower than the pressure on the master side. The detected pressure difference is compared with a threshold value $L_{th}$ in a decision part 19. When the detected pressure difference is smaller than the threshold value $L_{th}$, it is decided that the work 22W is leak-free or that the leak is negligibly small, and when the pressure difference is larger than the threshold value $L_{th}$, the work 22W is decided to be leaky. In this case, if the work 22W does not leak, the pressure difference ought to be zero. In practice, however, the pressure difference frequently develops even if the work 22W does not leak. Such a situation might be the case wherein when the temperature of the work 22W heated on the production line is still higher than the temperature of the master 22M (room temperature, for instance), the measurement of the pressure difference is started and thereafter the pressure in the work 22W drops as its temperature is gradually reduced toward that of the master 22M as a result of thermal radiation. Even if no leaks are detected, the pressure difference usually varies due to temporal changes in the temperature difference between the work 22W and the master 22M. A description will be given below, with reference to FIG. 2, of how the pressure difference varies during measurements.

In FIG. 2, the curve 2A indicates the pressure difference when the work 22W does not leak and the curve 2B the pressure difference when the work 22W leaks. As shown, the pressure difference develops at and after time $t_s$ when the electromagnetic valves 16W and 16M depicted in FIG. 1 are closed, and thereafter the pressure difference varies unstably until time $t_a$. This is primarily due to a shock resulting from the closing of the electromagnetic valves 16W and 16M. Then, the pressure difference undergoes substantially linear variation during the time interval from $t_a$ to $t_b$. The reason for this is, for example, that the temperature of the pressurized gas introduced into the work 22W as mentioned above is gradually lowered. And the pressure difference varies in a smooth curve from time $t_b$ to $t_c$, because the cooling rate of the pressurized gas reduces as its temperature approaches room temperature.

After time $t_c$, the pressure difference does not vary when the work is free of leaks, but in the case of a leaky work, the pressure difference further undergoes linear variation. This period will hereinafter be referred to as a "stabilization period." Since the gas temperature in either of the work and the master is considered to be equal to room temperature during this period, pressure difference variation per unit time is in proportion to the amount of leakage (cm$^3$/sec). The amount of leakage that is intended to be detected is appreciably small, and it can be regarded as substantially constant from time $t_s$ to the stabilization period after time $t_c$. Through utilization of this phenomenon it is possible to decide that the work is leak-free or leaky, depending upon whether the detected pressure difference variation per unit time after time $t_c$ is close to zero or not.

However, the conventional method is time-consuming since the measurement cannot be started until after time $t_c$. A differential pressure type leak tester that has been proposed as a solution to this problem is disclosed in Japanese Patent Application Laid-Open Gazette No. 4-506262. With this leak tester, the pressure difference variation per unit time is premeasured using a leak-free, non-defective work in the time interval $t_a$ to $t_b$ depicted in FIG. 2 during which the pressure difference varies linearly after time $t_a$ when it ceases from sharp variations. The abovementioned period from time $t_a$ to $t_b$ will hereinafter be referred to as a "measurement period."

In the actual leak test, pressure difference variation per unit time, $\Delta p/\Delta t$, is detected in the measuring period $t_a$ to $t_b$, and is compared with the pressure difference variation premeasured using the leak-free, non-defective work. It is possible to decide that the product under test is leak-free or leaky, depending upon whether the pressure difference values compared are nearly equal or not. This enables the measurement to start prior to time $t_c$ and hence permits reduction of the measurement time.

This prior art method is effective in reducing the measurement time but requires the preparation of a non-defective work. To solve this problem there has been proposed such a method as described below.

To begin with, two pressure differences $p_1$ and $p_2$ are measured, using a sample work, at a predetermined time interval $\Delta t$ (two seconds, for instance) in the measurement period from time $t_a$ to $t_b$ shown in FIG. 3, and pressure difference variation per unit time, $\delta p_1 = (p_2 - p_1)/\Delta t = \delta p_1/\delta t$, is calculated from the two pressure differences $p_1$ and $p_2$. This is followed by calculating pressure difference variation per unit time, $\delta p_2$, from two pressure differences $p_3$ and $p_4$ similarly measured at the predetermined time interval $\Delta t$ in the stabilization period after time $t_c$. The pressure difference variations per unit time, $\delta p_1$ and $\delta p_2$, are calculated as follows:

$$\delta p_1 = (p_2-p_1)/\Delta t = \Delta p_1/\Delta t$$

$$\delta p_2 = (p_4-p_3)/\Delta t = \Delta p_2/\Delta t$$

The pressure difference variation $\delta p_2$ in the stable period can be regarded as a variation attributable to leaks of the work. The pressure difference variation $\delta p_1$ in the measurement period can be regarded as the sum of the abovementioned variation $\delta p_2$ and the amount of variation which occurs even in the absence of leaks (which variation will hereinafter referred to as the "amount of drift" or simply as "drift"). Thus, the drift $p_d$ can be obtained by subtracting the pressure difference variation $\delta p_2$ from $\delta p_1$. In this way, the drift, $p_d = \delta p_1 - \delta p_2$, is precalculated.

In the actual leak test, the pressure difference variation per unit time is calculated first on the work under test during the time interval between $t_1$ to $t_2$, and the abovementioned drift is subtracted from the pressure difference variation to obtain a correction result. Finally, the presence or absence of leaks is decided, depending on whether the correction result falls within a predetermined range of values.

This method permits correction using one sample work (without distinction of leakage), and hence does not involve the preparation of leak-free, non-defective work. Further, the pressure difference variation needs only to be measured on the sample work until the stabilization period, and the measurements can be made on other works at earlier timing to determine if they are leak-free or leaky.

With the prior art, however, it is necessary to measure the pressure differences $p_1$ and $p_2$ in the measurement period and the pressure differences $p_3$ and $p_4$ in the stabilization period by a single differential pressure sensor as depicted in FIG. 3. In general, there is a limit to the number of digits of each value that a single differential pressure sensor can measure with accuracy. The minimum resolution of a differential pressure sensor capable of measuring large pressure differences is more coarse than the minimum resolution of a differential pressure sensor for measuring small pressure differences. For this reason, a small pressure difference (for example, 0.1 mmHg) cannot be detected with high accuracy by a differential pressure sensor for large pressure differences (for example, 100 mmHg). Hence, the prior art encounters difficulty in calculating drift with high accuracy.

On the other hand, the proposal made in Japanese Patent Application Laid-Open Gazette No. 4-506262 mentioned above involves the preparation of a leak-free, non-defective work.

SUMMARY OF THE INVENTION

It is therefore an object of the present invention to provide a leak test method and apparatus with which it is possible to make an accurate determination whether or not pressurized gas introduced in a work leaks out therefrom, without involving the preparation of a leak-free, non-defective sample work and the measurement of a large pressure difference.

According to a first aspect of the present invention, there are provided a leak test method and apparatus in which: pressurized gas is introduced into a master and a work; the pressure difference therebetween is measured by a differential pressure sensor; pressure difference variation per unit time is calculated from the measured pressure difference variation; the amount of drift is subtracted from the calculated pressure difference variation to obtain the amount of leakage; and based on the leakage, it is determined whether or not the pressurized gas leaks out from the work. In this instance, first and second pressure difference variations per unit time are each measured immediately after a pressure equilibrium is established between the master and the work.

With the method and apparatus according to the first aspect of the invention, the absolute value of the pressure difference to be detected for the detection of the first and the second pressure difference variation can be held small by the pressure equilibration between the master and the work during the time interval from when the first pressure difference variation is measured in the measurement period and the second pressure difference variation is measured in the stabilization period. This allows the use of a fine-resolution, sensitive differential pressure sensor, providing increased accuracy in making drift calculation. Besides, the drift calculation can be made using a given work instead of using a leak-free, non-defective work.

According to a second aspect of the present invention, the drift obtained by a drift calculation process in the above is stored in a drift table. In a leak test mode, the data stored in the drift table is used to calculate a moving average of drift, then a third pressure difference variation is measured on the work under test, then the moving average drift is subtracted from the third pressure difference variation to obtain leakage, and when the leakage is equal to or smaller than a predetermined threshold value, the third pressure difference variation is stored as drift in the drift table.

With the above scheme, an initial drift is stored first in the drift table and then the third pressure difference variation is stored therein only when the work under test is decided to be free of leaks. The leakage is calculated from the third pressure difference variation and the moving average calculated base on the data stored in the drift table. Since the third pressure difference variation is susceptible to the influence of a temperature change or the like, the moving average varies with a temperature change or the like, accordingly. It is possible, therefore, to accurately determine if the work leaks out therefrom the pressurized gas independently of temperature changes.

According to a third aspect of the present invention, the drift is given, by a linear approximate expression $p_d = K(T_A - T_B) + C$, as a linear function of the difference between the temperature $T_A$ of the work and the temperature $T_B$ of a jig. The constants C and K are obtained in advance on various types of works and stored in a memory. In the leak test mode, the constants C and K corresponding to the type of work under test are read out of the memory and are used to calculate drift from the detected work and jig temperatures $T_A$ and $T_B$ by the linear approximate expression.

With this scheme, the works of any types with the constants C and K already measured thereon can be tested for leaks at any temperatures even after they are heat-processed on production lines.

BRIEF DESCRIPTION OF THE DRAWINGS

FIG. 15A is a diagram depicting an example of a drift table;

FIG. 15B is a diagram depicting updating of the drift table;

DESCRIPTION OF THE PREFERRED EMBODIMENTS

With reference to the accompanying drawings, embodiments of the present invention will hereinafter be described.

FIRST EMBODIMENT

Figure 4:
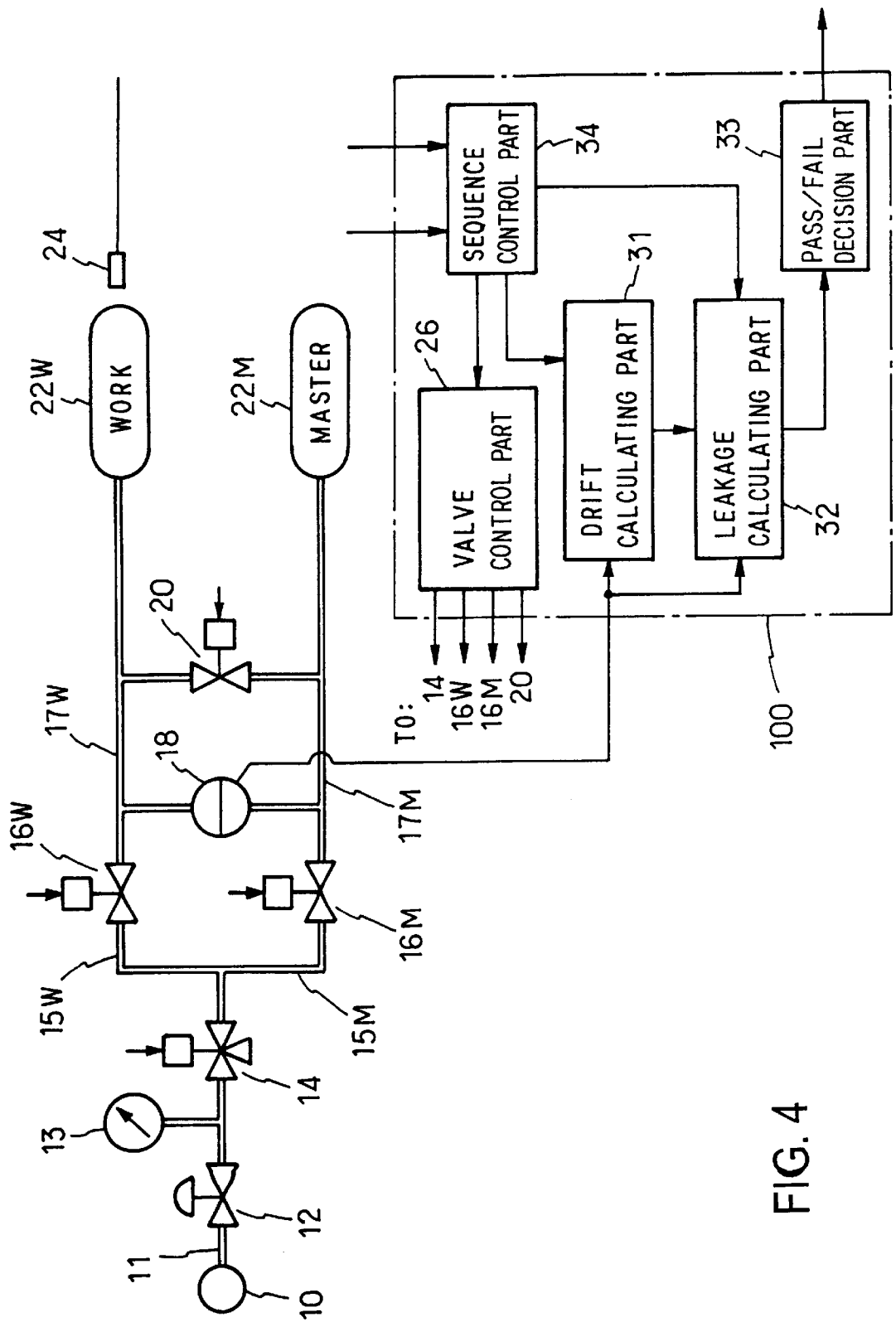
FIG. 4 is a block diagram illustrating the leak test apparatus according to the present invention.
Figure 5:
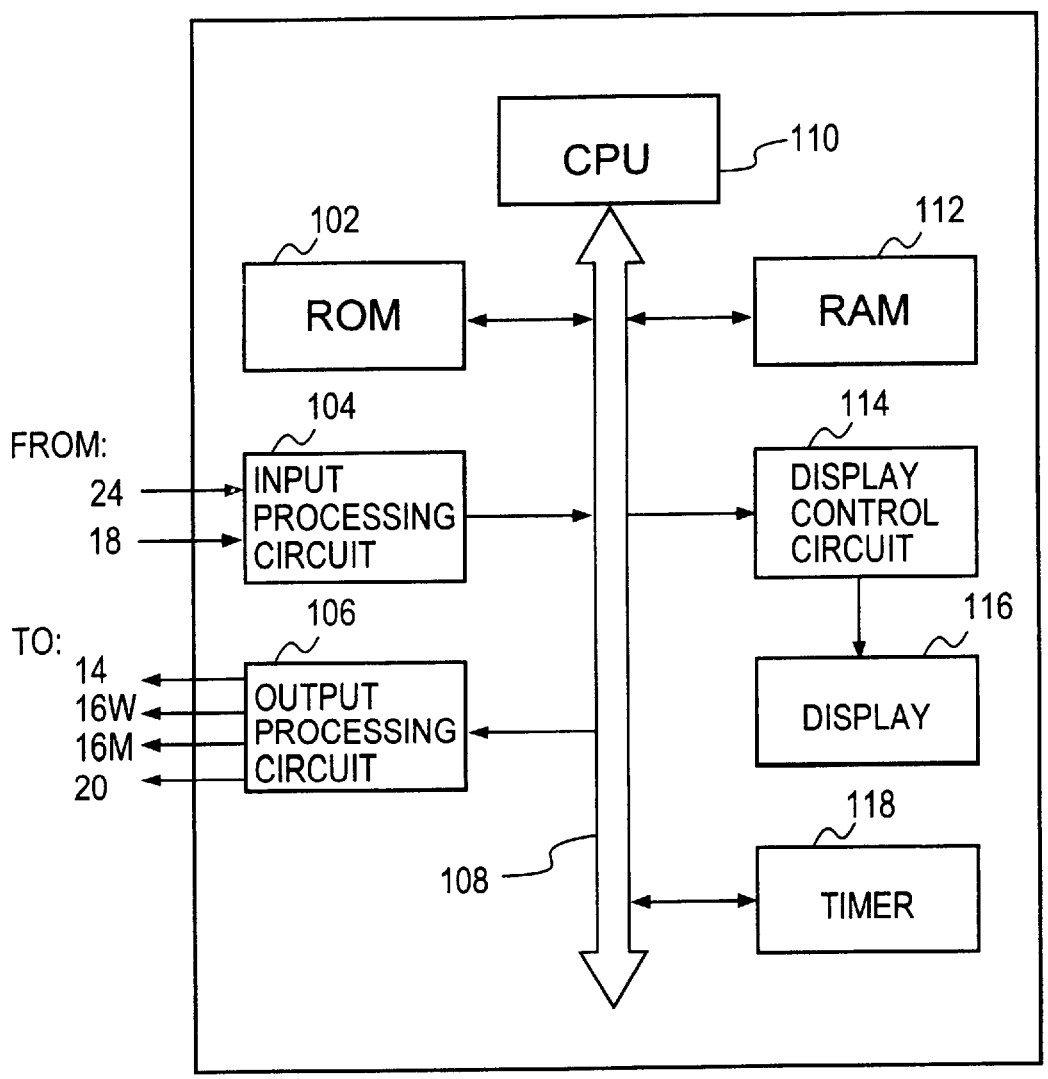
FIG. 5 is a block diagram depicting a control 100 in FIG. 4 formed by a computer.
Figure 6:
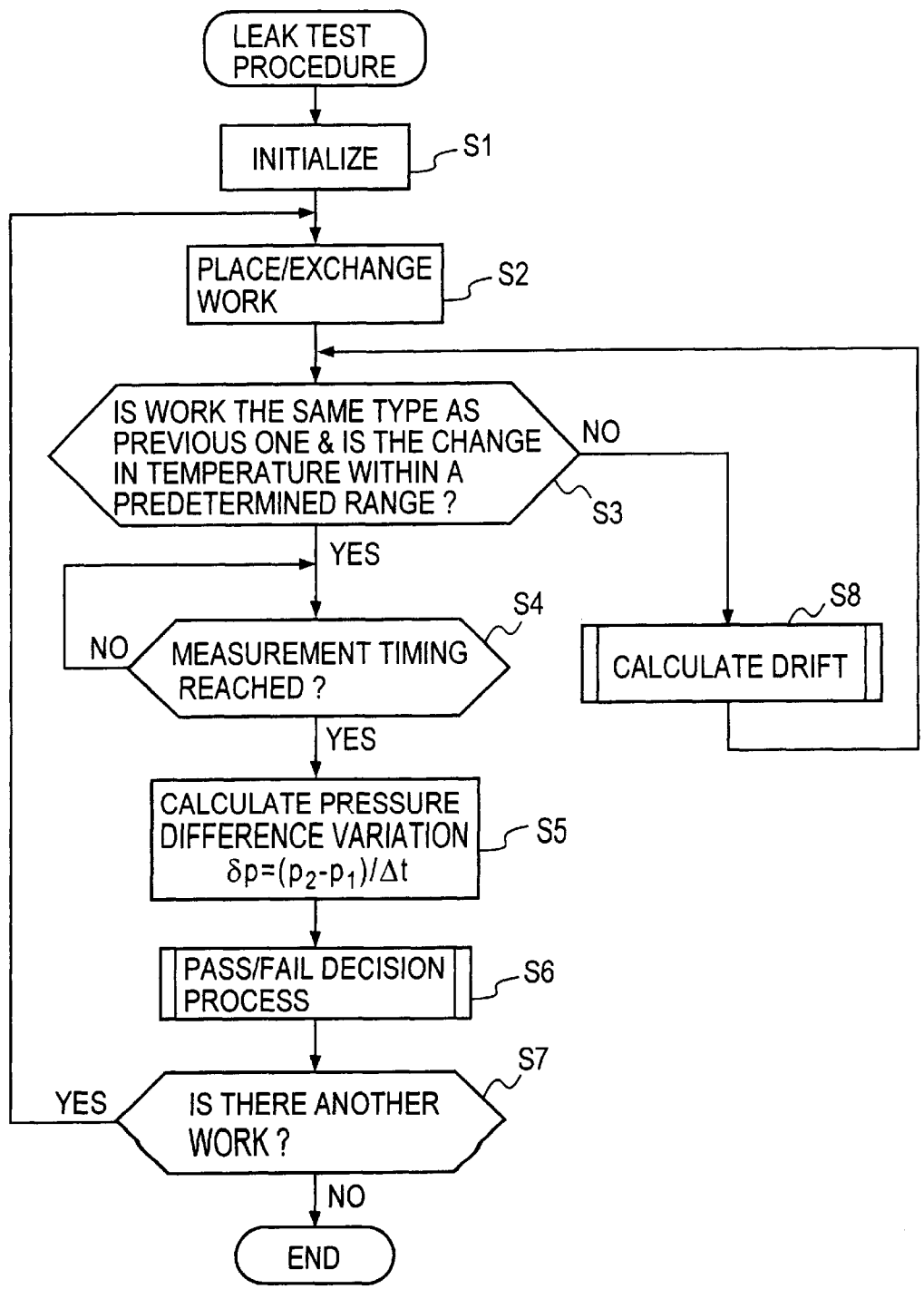
FIG. 6 is a flowchart showing a leak test procedure in a first embodiment of the leak test method according to the present invention.
Figure 7:
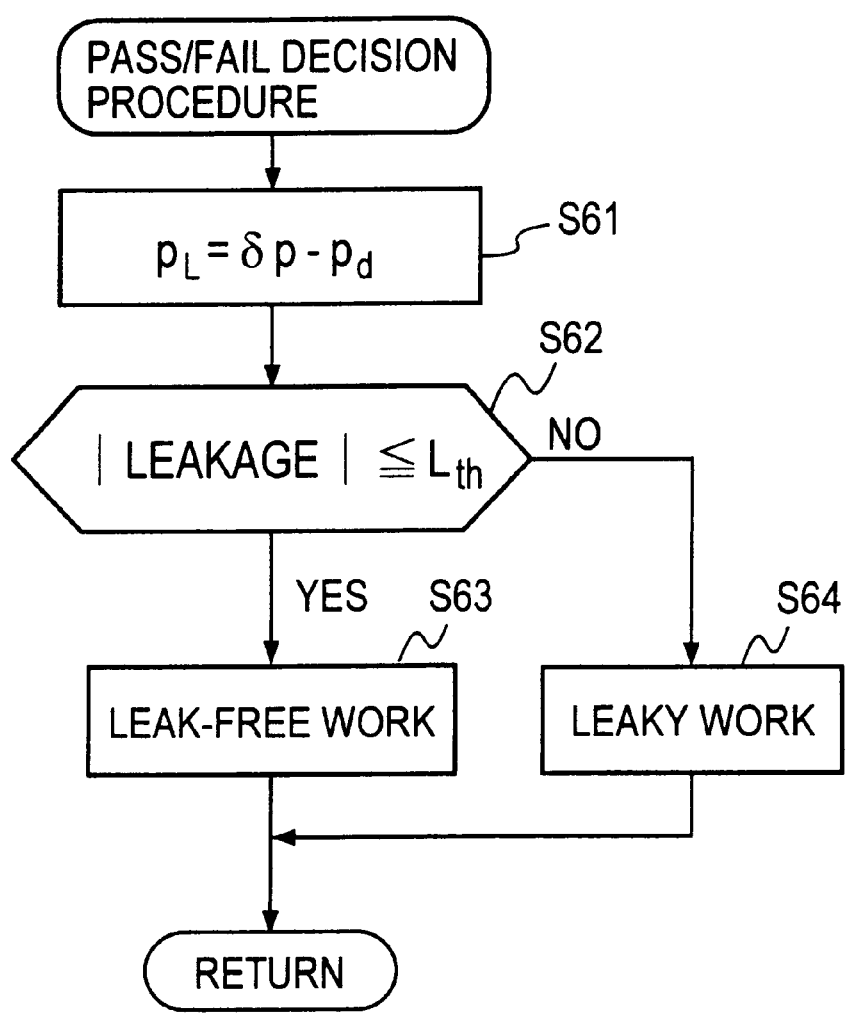
FIG. 7 is a flowchart showing a pass/fail decision process in the flowchart of FIG. 6.
Figure 8:
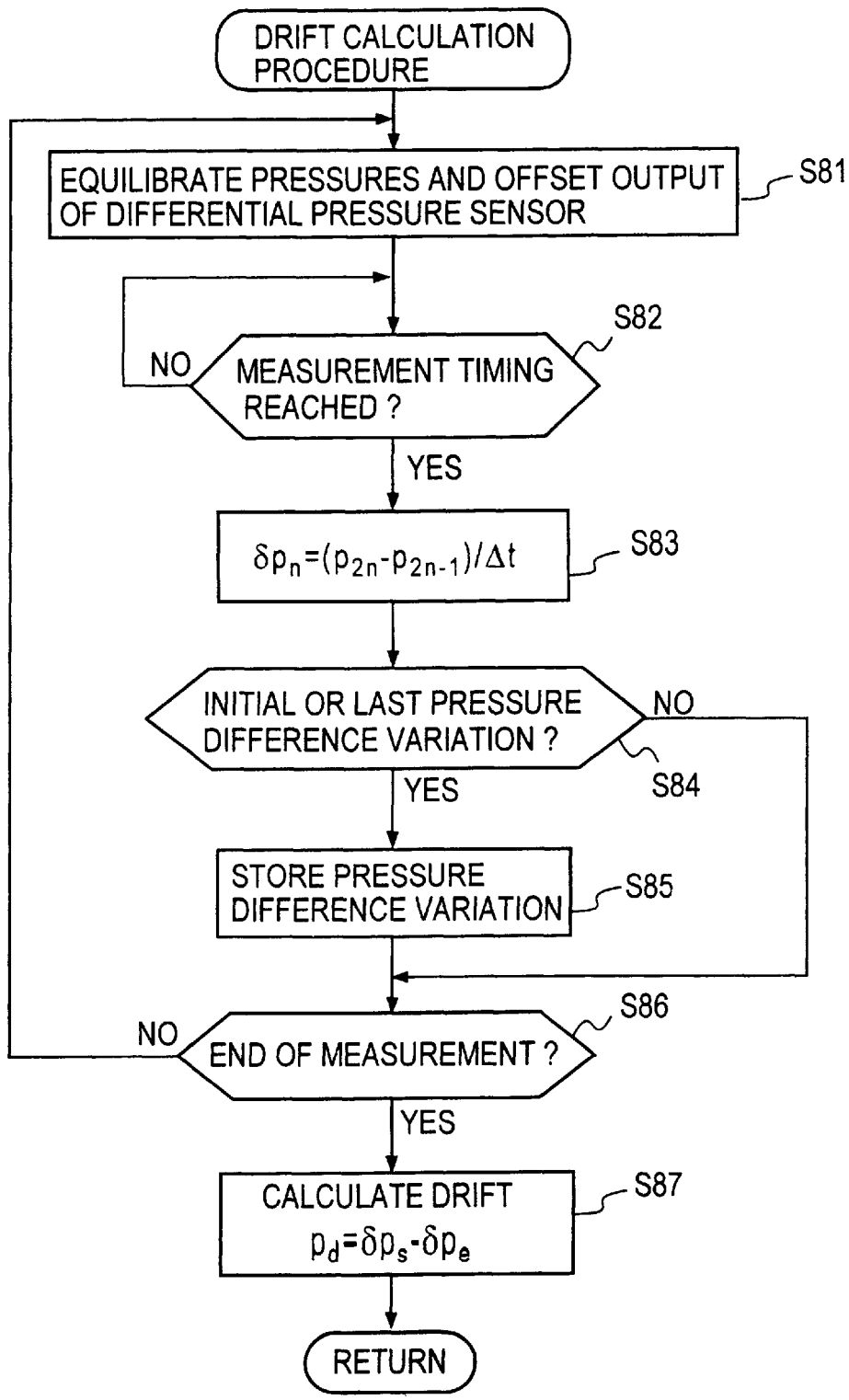
FIG. 8 is a flowchart showing a drift calculation process in the flowchart of FIG. 6.

Referring first to FIGS. 4 to 9, a first embodiment of the present invention will be described. FIG. 4 depicts the pipe arrangement of the leak test apparatus of this embodiment and a functional block configuration of a control 100 and FIG. 5 a functional block configuration of the control 100 formed by a microcomputer. FIGS. 6, 7 and 8 are flowcharts showing a leak test procedure, a decision procedure, and a drift calculation procedure, respectively. FIGS. 9A and 9B are graphs showing changes in pressure differences that are measured in the procedures depicted in FIGS. 6 to 8.

In FIG. 4 the pressurized gas source 10 is connected via the pressure regulating valve 12 and the three-way electromagnetic valve 14 to the electromagnetic valve 16W and the electromagnetic valve 16M by branch lines 15W and 15M, respectively. The electromagnetic valves 16W and 16M are connected by conduits 17W and 17M to the work 22W and the 22M, respectively. Connected between the work 22W and the master 22M is the differential pressure sensor 18. A thermometer 24 measures the temperature of the work 22W and room temperature. The differential pressure sensor 18 is connected between the conduits 17W and 17M to detect the pressure difference therebetween. According to the present invention, an electromagnetic valve 20 is connected between the conduits 17W and 17M in parallel relation to the differential pressure sensor 18.

The control 100 has, as its functional blocks, a valve control part 26, a drift calculating part 31, a leakage calculating part 32, a pass/fail decision part 33, and a sequence control part 34. The valve control part 26 drives the electromagnetic valves 14, 16W, 16M, and 20 to open and close them under the control of the sequence control part 34. The drift calculating part 31 calculates an initial drift amount on the work 22W on the basis of pressure differences detected by the differential pressure sensor 18 several times in drift calculating mode under the control of the sequence control part 34. The leakage calculating part 32 calculates the amount of leakage by correcting the detected initial pressure difference variation with the drift amount in a leak test mode under the control of the sequence control part 34. The pass/fail decision part 33 compares the absolute value of the calculated drift with a reference value, and decides that the product under test is leak-free or leaky, depending upon whether the absolute value is smaller or larger than the reference value. Under the control of a leak test program the sequence control part 34 decides whether to execute the drift calculating mode or the leak test mode according to the detected temperature the work under test and its type and, at the timing sequence corresponding to the mode decided to execute, applies an electromagnetic valve open/close control signal to the valve control part 26 or instructs the drift calculating part 31 and the leakage calculating part 32 to take in the detected pressure difference and calculate the amounts of drift and leakage, respectively.

The functional configurations of the valve control part 26, the drift calculating part 31, the leakage calculating part 32, the pass/fail decision part 33, and the sequence control part 34 of the control 100 depicted in FIG. 4 are computerized as shown in FIG. 5. Accordingly, the control 100 has a CPU 110, a ROM 102, a RAM 112, an input processing circuit 104, an output processing circuit 106, a display control circuit 114, a display unit 116, and a timer 118 which are components of ordinary computers. Incidentally, other function control parts for the mounting and exchange of the work 22W and the like are not shown for the sake of brevity.

The CPU 110 controls the electromagnetic valves 14, 16W, 16M, and 20 under the control of a leak test program stored in the ROM 102. The leak test program contains various programs for leak test, pass/fail decision, drift calculating, and other procedures in the flowcharts described later on. In the RAM 112, there are stored various kinds of data, such as the temperature of the work 22W, room temperature, the pressure difference, the pressure difference variation, the amount of drift, correction results, a drift table, a moving average, and a threshold value. The following embodiments will be described in connection with the case of storing various kinds of data in the RAM 112.

The input processing circuit is 104 A/D converts the detected signals from the differential pressure sensor 18 and the thermometer 24, and provides them to the CPU 110 or stores them in the RAM 112. The input processing circuit 104, which A/D converts the pressure difference signal from the differential pressure sensor 18, and the CPU 110, which uses the pressure difference data from the input processing circuit to calculate drift under the control of a program stored in the ROM 102, constitute the drift calculating part 31 in FIG. 4. The output processing circuit 106 outputs drive voltages for opening or closing the electromagnetic valves 14, 16W, 16M, and 20 in response to an open/close control signal sent from the CPU 110 via a bus 108 at predetermined timing. That is, the CPU 110, which outputs the valve control signal under the control of the program stored in the ROM 102, and the output processing circuit 106, which responds to the control signal to output the valve drive voltages, constitute the valve control part 26. The display control circuit 114 displays test conclusions on the display unit 116 based on display data sent from the CPU 110 or the like via the bus 108.

The final decision on whether the work 22W leaks or not is made in the control 100 described above. These processes are implemented by executing the procedures depicted in FIGS. 6 to 8. A detailed description will be given of each procedure.

In the leak test procedure depicted in FIG. 6, the following steps are executed:

Step S1: The procedure begins with initialization. This initialization step is, for example, to clear various kinds of data stored in the RAM 112 and set room temperature as a reference temperature.

Step S2: Next, the work 22W to be tested for leaks is mounted in position. Then, the electromagnetic valves 14, 16W, and 16M are opened to introduce pressurized gas into the work 22W and the master 22M, and the electromagnetic valves 16W, and 16M are closed.

Step S3: The type of the work 22W is detected, and the current room temperature is measured using the thermometer 24. In the case where the work 22W is of the same type as the previous one tested for leaks and a room temperature change falls within a predetermined range relative to the reference temperature (YES), the electromagnetic valve 20 is closed in the aforementioned measurement period and then the procedure goes to step S4; if NOT, then the procedure goes to step S8.

Step S4: The procedure waits for a predetermined time interval between the closure of the electromagnetic valve 20 and the measurement period.

Step S5: The pressure difference variation per unit time, δp, is calculated in the measurement period. More specifically, the pressure difference variation δp is calculated as described below. That is, the first pressure difference $p_1$ between the work 22W and the master 22M is measured in the measurement period, and after the predetermined time Δt has elapsed, the second pressure difference $p_2$ is measured. These two measurements used are to derive the respective pressure differences from the values of signals that are both provided from the differential pressure sensor 18. Based on the first-measured pressure difference $p_1$, the second pressure difference $p_2$ measured after the predetermined time interval, and the predetermined time Δt, the pressure difference variation per unit time, δp, is computed by the following equation.

$$\delta p = (p_2 - p_1)/\Delta t \quad (1)$$

Step S6: The pressure difference variation δp thus obtained is corrected using the amount of drift, and based on the result of correction, a pass/fail decision process is executed to make a determination whether or not the pressurized gas leaks out of the work 22W. This decision process will be described later on with reference to FIG. 7.

Step S7: The electromagnetic valve 14 is vented and the electromagnetic valves 16W, and 16M are opened to restore the atmospheric pressure in the work 22W and the master 22M. A check is made to see if there is another work to be tested, and if so, then the procedure returns to step S2, followed by repeating steps S2 to S6 described above. In the absence of such another work, the test is finished.

Step S8: When the type of work currently under test differs from the type of work tested, and/or if the measured room temperature falls far outside the predetermined range relative to the reference temperature, the drift $p_d$ is calculated by the drift calculation process described later on with reference to FIG. 8 and is used to update the previously calculated drift, and the settings of the type of work and the reference temperature are updated, after which the procedure returns to step S3.

Turning now to FIG. 7, the pass/fail decision process of step S6 will be described below.

S61: To determine if the pressurized gas leaks out of the work 22W, a drift component is removed from the pressure difference variation δp measured in step S5 to obtain a corrected pressure difference variation $p_L$. In this case, it is assumed that the amount of drift was measured in step S8.

Step S62: Next, a check is made to see if the corrected pressure difference variation $p_L$ is within the range of a threshold value. The corrected pressure difference variation $p_L$ is calculated by the following equation based on the pressure difference variation per unit time, δp, and the drift $p_d$ calculated by the drift calculating process described below.

$$p_L = \delta p - p_d \quad (2)$$

The corrected pressure difference variation $p_L$ corresponds to the amount of leakage, and hence it will hereinafter be referred to as leakage.

Step S63: If it is found in step S62 that the absolute value of the leakage $p_L$ is within the range of the threshold value $L_{th}$ (YES), it is decided that the work under test is leak-free.

Step S64: If the absolute value of the leakage $p_L$ is outside the range of the threshold value $L_{th}$ (NO), the work is decided as leaky.

Figure 9A:
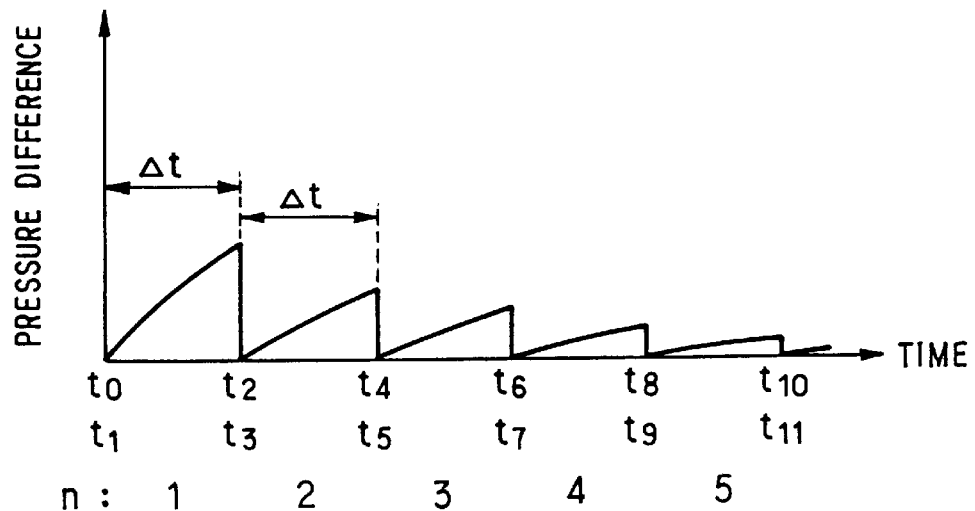
FIG. 9A is a graph showing changes in the pressure difference in the drift calculation procedure based on the principle of the present invention.

The drift calculation process of step S8 in FIG. 6 is a process that the drift calculating part 31 in FIG. 4 executes. In the measurement period starting at the timing $t_a$, this process is executed using the procedure depicted in FIG. 8. In FIG. 9A, there are shown variations that the output from the differential pressure sensor 18 undergoes as the drift calculating process is executed. In this drift calculating process, the pressure difference variation $\delta p = (p_2 - p_1)/\Delta t$ is measured N times. The entire length $t_0$ to $t_{2N}$ of the measurement sequence for the drift calculation is predetermined to make the first (n=1) measurement in the measurement period $t_a$ to $t_b$, and the last (n=N, where N is an integer equal to or greater than 2) measurement in the stable period (after $t_c$). In the following description, the first (n=1) pressure difference variation will be referred to as the initial pressure difference variation and identified by $\delta p_s$ and the last (n=N) pressure difference variation as the final pressure difference variation and identified by $\delta p_e$.

Step S81: An n-th pressure difference variation measurement begins with the application of a signal from the CPU 110 via the output processing circuit 106 to the electromagnetic valve 20 at time $t_{2(n-1)}$ to open it to equilibrate the pressures in the work 22W and the master 22M, immediately followed by closing the electromagnetic valve 20. Then the pressure difference value (i.e. a voltage value) $p_{2n-1}$, which is output from the differential pressure sensor 18 at time $t_{2n-1}$, is scored in the RAM 112.

Step S82: Next, the procedure waits for the time interval $\Delta t$ between time $t_{2n-1}$ and the measurement time $t_{2n}$.

Step S83: At time $t_{2n}$, the pressure difference value $p_{2n}$ detected by the differential pressure sensor 18 is read into the input processing circuit 104. At this time, the n-th pressure difference variation is calculated as given below.

$$\delta p_n = (p_{2n} - p_{2n-1})/\Delta t \tag{3}$$

where $p_{2n-1}$ and $p_{2n}$ are pressure differences measured n-th time at measurement times $t_{2n-1}$ and $t_{2n}$ set $\Delta t$ apart.

In practice, the detected pressure value $p_{2n-1}$ at time $t_{2n-1}$ in step S81 need not be stored in the memory 112 and the detected pressure difference $p_{2n-1}$ at time $t_{2n-1}$ needs only to be reset to zero by digital processing. The subsequent detected pressure differences are obtained as variations relative to the true pressure difference at the reset time $t_{2n-1}$. Accordingly, the detected pressure difference at time $t_{2n}$ in step S8 is the pressure difference variation $(p_{2n} - p_{2n-1})$ itself in Eq. (3).

Step S84: A check is made to see if the current measurement is the first (n=1) or final (n=N) measurement.

Step S85: Only when the measurement is the first or final one, the pressure difference variation is stored as $\delta p_s$ or $\delta p_e$ in the RAM 112.

Step S86: The above-described processes of steps S81 to S85 are repeated from the first (n=1) to final (n=N) measurements to determine whether or not the last (n=N) pressure difference variation has been measured. In this way, the initial pressure difference variation per unit time, $\delta p_s = p_1$, measured first and the pressure difference variation per unit time, $\delta p_e = p_N$, measured last are stored. Step S87: Where the current measurement timing is the last one $t_{2N}$, the drift $p_d$ contained in the initial pressure difference variation $\delta p_s$ is computed. The drift $p_d$ is obtained as the difference between the initial pressure difference variation $\delta p_s = \delta p_1$ and the last pressure difference variation $\delta p_e = p_N$ both stored in the RAM 112, and is given by the following equation.

$$p_d = \delta p_s - \delta p_e \tag{4}$$

The drift calculating process ends with the calculation of the initial drift $p_d$, and the procedure returns to step S3 of the pass/fail decision process depicted in FIG. 6, starting the process on the work 22W. The processing from steps S3 to S7 will hereinafter be called a leak test mode and the processing of step S8 a drift calculation mode.

Figure 9B:
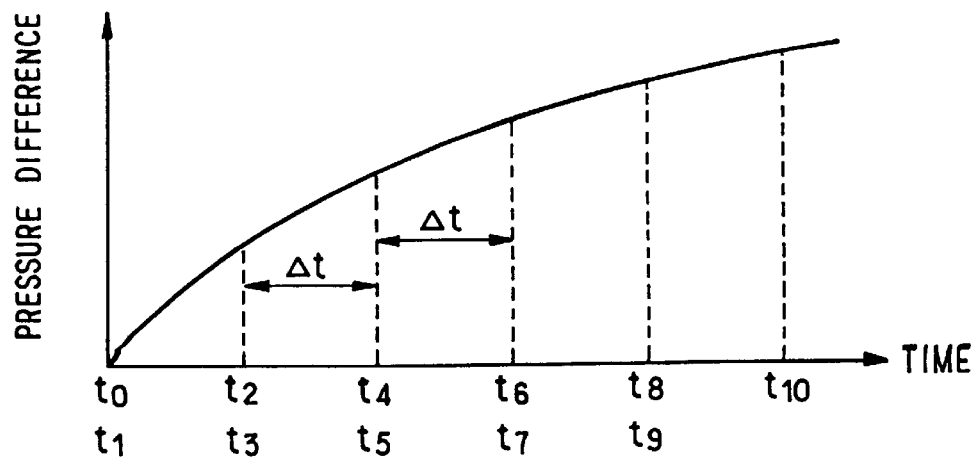
FIG. 9B is a graph showing changes in the pressure difference in a conventional drift calculation procedure.

In the prior art, the pressure difference between the work 22W and the master 22M increases with the lapse of time as depicted in FIG. 9B. In contrast thereto, according to the above-described first embodiment, the pressures in the work 22W and the master 22M are equilibrated by opening the electromagnetic valve 20 at the measurement of each pressure difference (time $t_2$, $t_4$, $t_6$, $t_8$, . . . ) in step S81 in FIG. 8. As a result, the pressure difference between the work 22W and the master 22M repeats increasing from zero as shown in FIG. 9A. That is, after executing the process of step S83 for obtaining the n-th pressure difference variation $\delta p_n$, the procedure returns via steps G84, G85 and S86 to step S81, wherein the electromagnetic valve 20 is opened for pressure equilibration to start measuring the nth-plus-one pressure difference variation $\delta p_{n+1}$ and is closed thereafter. On this account, the absolute value of the pressure difference which is provided to the differential pressure sensor 18 does not become so large; therefore, a differential pressure sensor of high sensitivity can be employed. Since the pressure difference variations $\delta p_s$ and $\delta p_e$ can be measured with higher accuracy, the initial drift $p_d$ is also accurate. Further, the calculation of the drift $p_d$ does not require the use of a leak-free, non-defective work and can be made using a given work. Incidentally, since the amounts calculated by Eqs. (1) to (4) are variations per unit time $\Delta t$, the value $\Delta t$ can be freely chosen as long as it held constant. In the actual measurement, the value $\delta p$ or $\delta p_n$ may be defined as given below, setting $\Delta t = 1$ in Eq. (1) or (3) regardless of the constant value $\Delta t$ used.

$$\delta p = p_2 - p_1 \tag{1'}$$

$$\delta p_n = p_{2n} - p_{2n-1} \tag{3'}$$

The same holds true with regard to all the embodiments described later on.

MODIFICATIONS OF FIRST EMBODIMENT

Figure 10A:
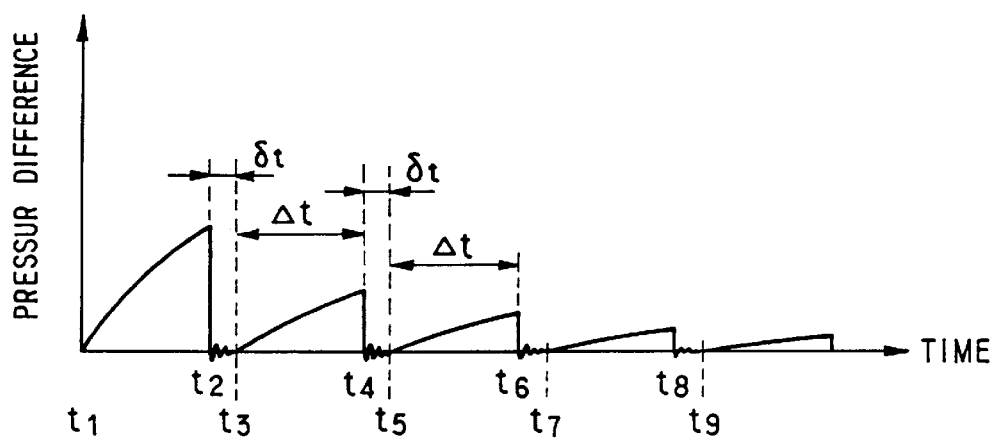
FIG. 10A is a graph showing changes in the pressure difference, for explaining a modified form of the drift calculation procedure in the first embodiment.

Modified Form 1: In the initial drift calculation procedure of FIG. 8, the pressure difference between the work 22W and the master 22M which is measured by the differential pressure sensor 18 slightly fluctuates due to shock by the opening of the electromagnetic valve 20 immediately thereafter. The influence of such fluctuations in the pressure difference can be avoided by a method shown in FIG. 10A, wherein the pressures are equilibrated by opening the electromagnetic valve 20 and kept in equilibrium by a fixed time interval bt during which to allow the pressure difference fluctuations to be damped sufficiently, and the electromagnetic valve 20 is closed, followed by measuring the pressure difference. This method prevents the influence of the pressure difference fluctuations by the opening of the electromagnetic valve 20 and hence provides increased accuracy in the detection of the pressure difference (and consequently the pressure difference variation per unit time and the amount of drift).

Figure 10C:
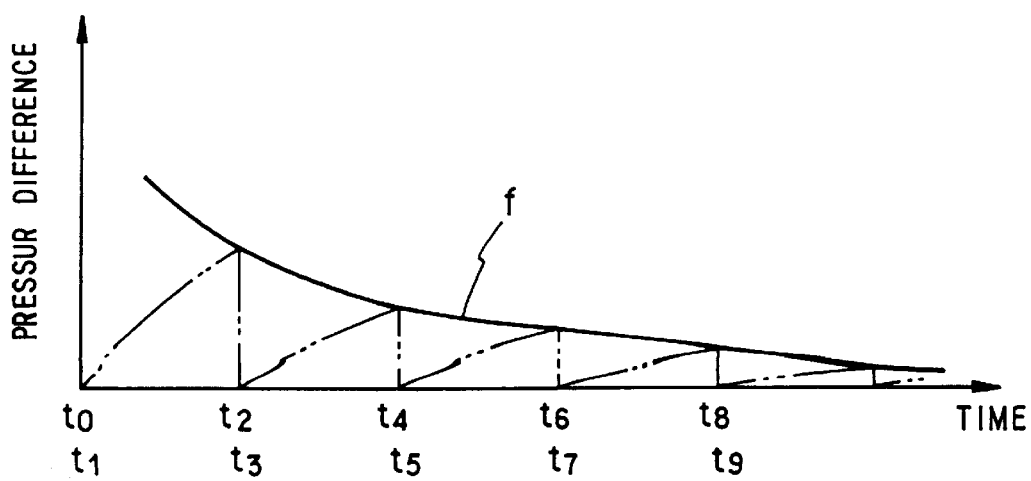
FIG. 10C is a graph showing changes in the pressure difference variation in the first embodiment in terms of an exponential function.
Figure 10B:
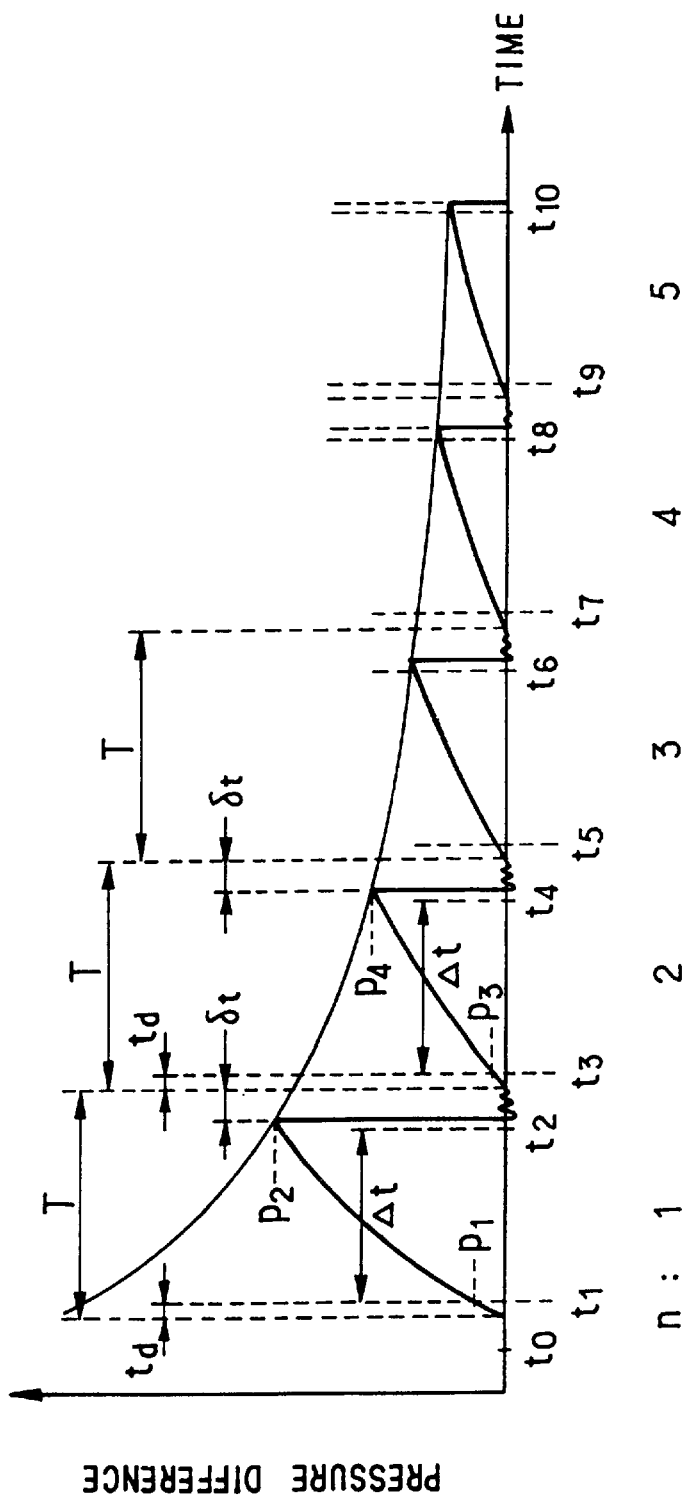
FIG. 10B is a graph showing changes in the pressure difference in a drift calculation procedure which is actually used.

Modified Form 2: The measurement sequence in the drift calculating procedure depicted in FIG. 9A is its simplified version intended to facilitate a better understanding of the principle of the present invention. In the actual measurement sequence, measurement is repeated at time intervals T longer than the predetermined period $\Delta t$ as depicted in FIG. 10B. At the start point of each measurement period T, the electromagnetic valve 20 is closed, and after elapsed time $t_d$, the reading of the first pressure difference value $p_{2n-1}$ output from the differential pressure sensor is reset to zero at time $t_{2n-1}$. The second pressure difference $p_{2n}$ is detected at time $t_{2n}$, the predetermined time $\Delta t$ after time $t_{2n-1}$. After the detection of the pressure difference $p_{2n}$ at time $t_{2n}$, the electromagnetic valve 20 is opened, and after the elapse of time $\Delta t$ the electromagnetic valve 20 is closed as is the case with the modification described above in respect of FIG. 10A, and the same measurement is repeated in the next measurement cycle T. Since the reading of the pressure difference $p_{2n-1}$ detected by the differential pressure sensor at time $t_{2n-1}$ is reset to zero, the reading of the differential pressure sensor output at the next measurement time $t_{2n}$ is also offset by the same value $p_{2n-1}$. Hence, the value of the true pressure difference variation $\delta p_n = p_{2n} - p_{2n-1}$ is equal to the reading of the offset value $p_{2n}$. In the other embodiments described below, too, the measurement in every measurement cycle T in the initial drift measurement sequence is carried out at the same time as described above with respect to FIG. 10B.

Figure 1:
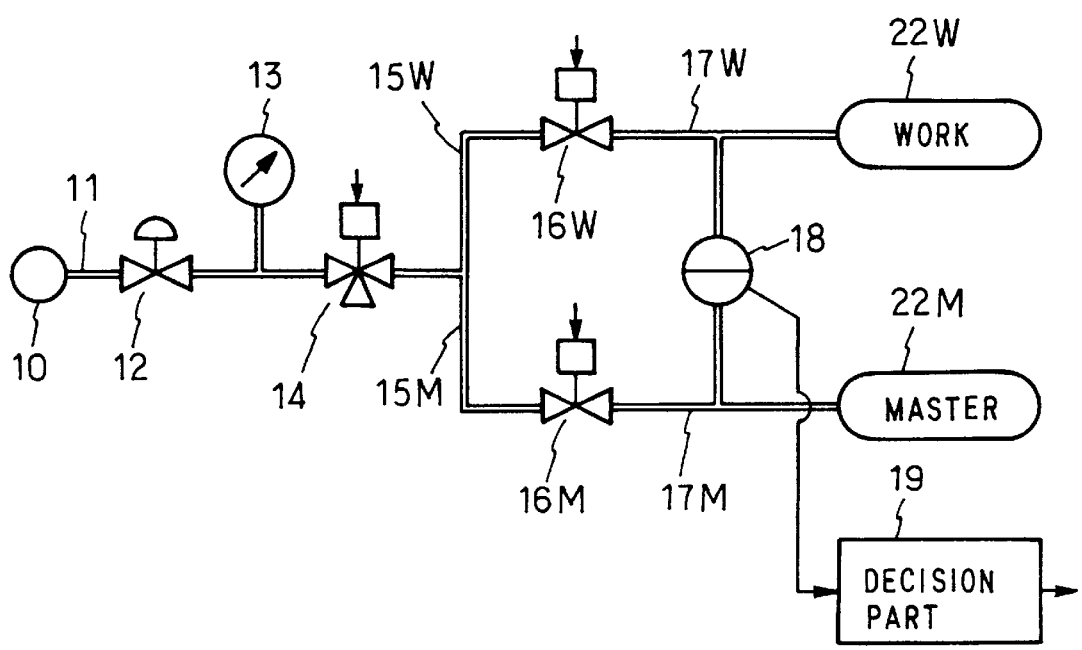
FIG. 1 is a block diagram illustrating the basic configuration of a conventional differential pressure type leak test apparatus.
Figure 2:
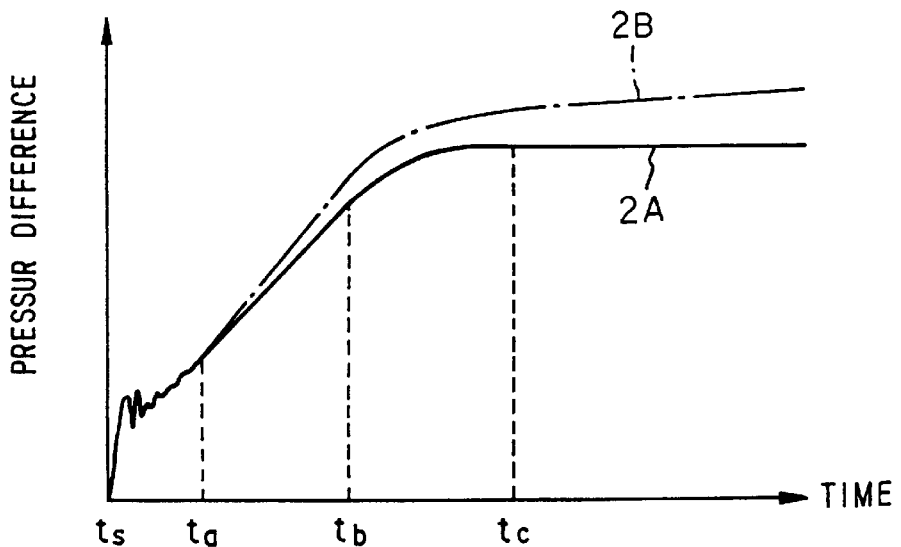
FIG. 2 is a graph showing changes in the pressure difference with time in the cases of leak-free and leaky works in FIG. 1.

Modified Form 3: The pressure difference variation at fixed time intervals Δt in the drift calculation procedure depicted in FIG. 8 exponentially decreases as indicated by the curve f in FIG. 10C, and converges to a virtually fixed value. The reason for this is that the temperature of the work connected, in heated state, to the conduit of the leak test apparatus gradually lowers due to thermal radiation. The value of convergence corresponds to the amount of leakage, and the exponential decrease in the pressure difference variation means an exponential reduction in the amount of drift attributable to an exponential decrease in the temperature difference between the work and the master—this means the pressure difference variation converges to zero with a decrease in the temperature difference. Now, approximate the curve f, for example, by the following exponential function and set an equation for computing the pressure difference p.

$$p = a \times \exp(-bt) + c \quad (5)$$

where a, b, and c are coefficients and t time. In the measurement period from ta to tb in FIG. 2, steps S81 to S86 in FIG. 8 are executed a plurality of times (concretely, three to five times) to measure the pressure difference between the work 22W and the master 22M. By applying the pressure difference p thus obtained to Eq. (5), the coefficients a, b, and c are determined. The coefficient c corresponds to a pressure difference variation by leaks of the work. Accordingly, even if works under test are those of the same type and whose initial temperatures are within a prescribed range with respect to a reference value, the constant c related to the amount of leakage differs from work to work. By applying desired points in time $t_e - \Delta t$ and $t_e$ in the stabilization period (after time tc in FIG. 2) to the above equation by which the coefficients a, b, and c are determined, it is possible to estimate and calculate pressure differences $p_{e-1}$ and $p_e$ at he time $t_{e-1} = t_e - \Delta t$ and $t_e$ in the stabilization period.

With this method, since the pressure differences in the stabilization period are obtained by several pressure difference measurements in the measurement period, the pressure difference variation per unit time in the stabilization period can be calculated. Thus, the time for calculating the amount of drift can be reduced significantly. In this case, too, the pressure equilibrium is established between the work 22W and the master 22M just prior to each measurement of the pressure difference in the measurement period; hence, the drift can be calculated with higher accuracy.

Figure 11:
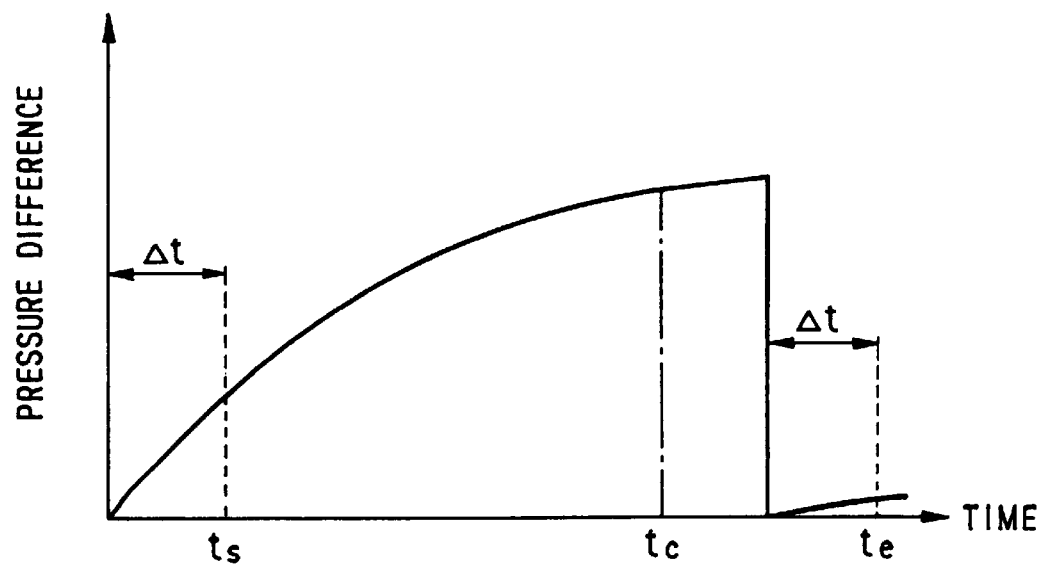
FIG. 11 is a graph showing changes in the pressure difference in a modified form of the drift calculation procedure in the first embodiment.
Figure 12:
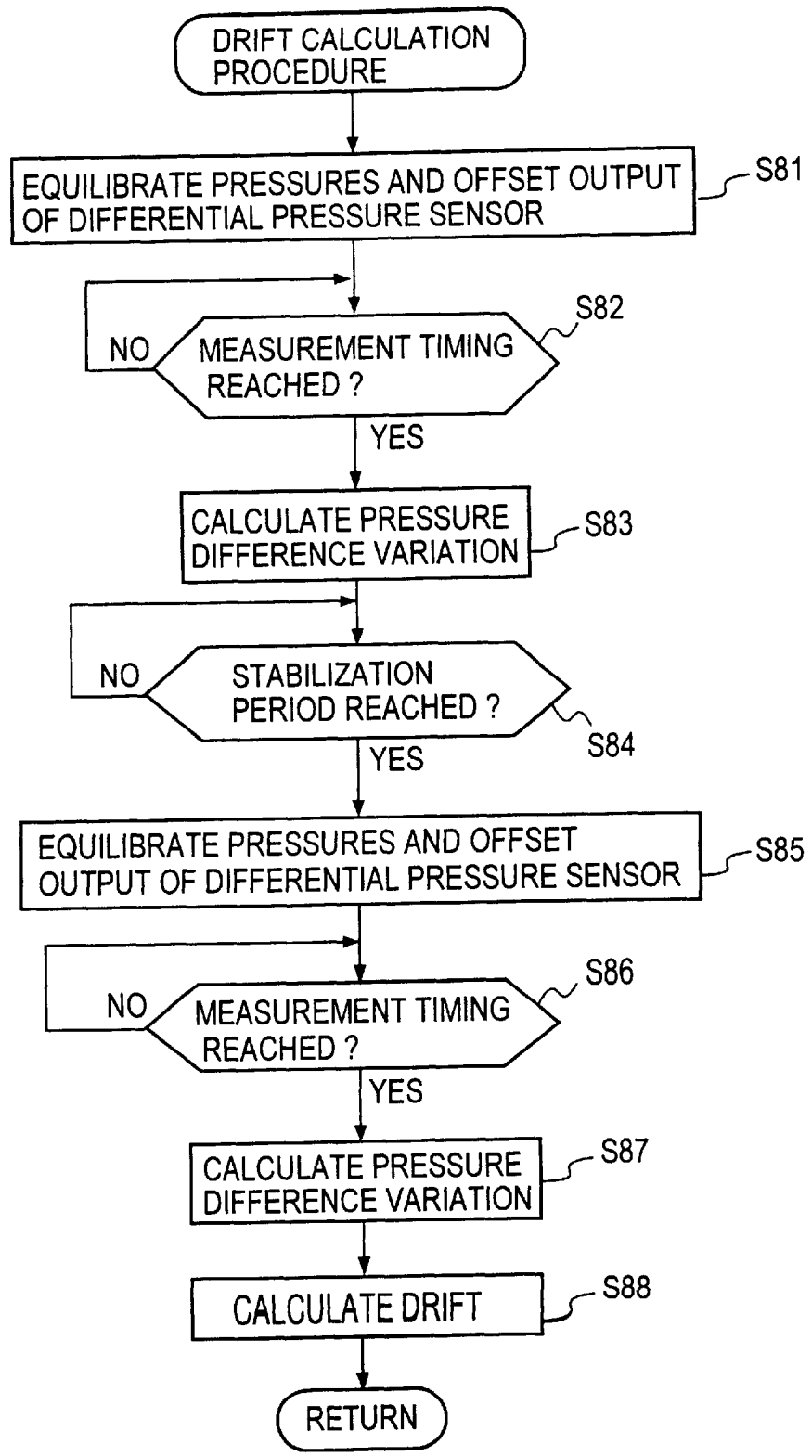
FIG. 12 is a flowchart showing a modified form of the drift calculation procedure in the first embodiment.

Modified Form 4: In the initial drift calculation procedure depicted in FIG. 8, a step of establishing the pressure equilibrium between the work 22W and the master 22M, closing the valve 20 and then measuring the pressure difference variation $\delta p_n$ by the differential pressure sensor 18 is executed N times. By this, the pressure difference measured by the differential pressure sensor 18 can be obtained with high accuracy. However, the calculation of the initial drift $p_d = \delta p_s - \delta p_e = p_1 - \delta_N$ requires only the first (n=1) and last (n=N) pressure difference variations $\delta p_1 = \delta p_s$ and $\delta p_N = \delta p_e$ and does not require the values of the pressure difference variations at points in time where n is 2 to N−1. Accordingly, by additionally performing only once the step of establishing the pressure equilibrium between the work 22W and the master 22M at point in time $t_e - \Delta t$, that is, Δt before the last measurement time $t_e$ as depicted in FIG. 11, the pressure difference can be detected more accurately than in the past. In FIG. 12, there is shown a flowchart for the drift calculation procedure in this case.

Step S81: In the measurement period, the electromagnetic valve 20 is opened first to establish the pressure equilibrium between the work 22W and the master 22M, then the valve 20 is closed, and the reading of the detected pressure difference value of the differential pressure sensor 18 is reset to zero.

Step S82: The procedure waits for the time interval Δt until the measurement time $t_s$.

Step S83: When the measurement time $t_s$ is reached, the difference pressure $p_s$ is measured, and a first differential pressure difference is calculated as the initial pressure difference variation $\delta p_s$. The method for obtaining this pressure difference variation is the same as in Step S5 in FIG. 6.

Step S84: Thereafter, the procedure waits until the stabilization period.

Step S85: In the stabilization period, the electromagnetic valve 20 is opened again to establish an equilibrium of pressures as in step S81, then the valve 20 is closed, and the reading of the detected pressure difference value of the differential pressure sensor 18 is reset to zero at time $t_e - \Delta t$.

Step S86: Following this, the procedure waits by the time interval Δt until the measurement time $t_e$.

Step S87: At the measurement time $t_e$ the pressure difference $p_e$ is measured and a second pressure difference variation is calculated as the last pressure difference variation $\delta p_e$.

Step S88: The amount of drift is calculated based on the two pressure difference variations $\delta p_s$ and $\delta p_e$ obtained as mentioned above. The method for the drift calculation is the same as in step S88 in FIG. 8.

Figure 3:
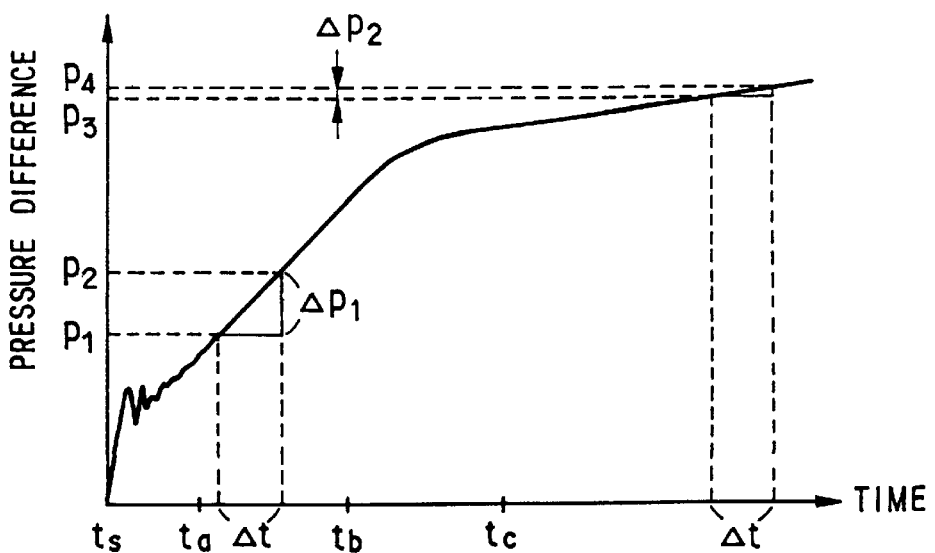
FIG. 3 is a graph for explaining the principle of leakage measurement in FIG. 1.

With the drift calculating procedure shown in FIG. 12, the pressure difference detected by the differential pressure sensor 18 varies in such a curve as depicted in FIG. 11. That is, immediately before time $t_s - \Delta t$ the valve 20 opened until then is closed and the pressure difference starts to increase, and at time $t_s - \Delta t$, the reading of the output value of the differential pressure sensor 18 is reset to zero, and at time $t_s$ the process of step S83 in FIG. 12 is executed to calculate the first pressure difference variation $\delta p_s$. Next, immediately before time $t_e - \Delta t$ in the stabilization period after time $t_c$, the valve 20 is opened again to provide the pressure equilibrium and then the valve 20 is closed, and at time $t_e - \Delta t$, the reading of the output value of the differential pressure sensor 18 is reset again to zero, and at time $t_s$ the process of step S87 is executed to obtain the second pressure difference variation $\Delta p_e$. This procedure also provides an accurate value of drift because of the pressure equilibration by the opening of the valve 20 just prior to the calculation of the second pressure difference variation. Accordingly, the drift can be obtained with higher accuracy than in the conventional method described previously with respect to FIG. 3.

SECOND EMBODIMENT

In the first embodiment, the drift $p_d$ is calculated each time a measurement environmental condition (room temperature) changes by a fixed quantity (steps S3 and S8 in FIG. 6). In practice, air temperature changes continuously, but the drift $p_d$ which is measured in the above embodiment follows the temperature change or the like on a stepwise basis. If the reference range of temperature variations is narrowed with a view to reducing the step size of the stepwise drift variation, the calculation of the drift $p_d$ needs to be done frequently and hence time-consuming, resulting in a decrease in the number of works that can be tested for leaks per unit time. From this point of view, a second embodiment performs a drift calculation more accurately responsive to temperature changes without decreasing (or for increasing) the number of works to be tested for leaks. Turning now to FIGS. 13 to 17, the second embodiment will be described below.

In the first embodiment, too, if the work under test is leak-free, the pressure difference variation measured within the measurement period $t_a$ to $t_b$ in step S6 in FIG. 6 represents the initial drift itself. In the second embodiment, even when the temperature environment change does not fall outside the predetermined range (that is, even when step S4 in FIG. 6 is not executed), if the current work of the same type as the immediately preceding tested work is decided to be free of leaks, the initial pressure difference variation $\delta p_s$ measured on the previous work is used as an estimated initial drift. By this, it is possible to determine the initial drift finely in response to the environmental temperature change.

Figure 13:
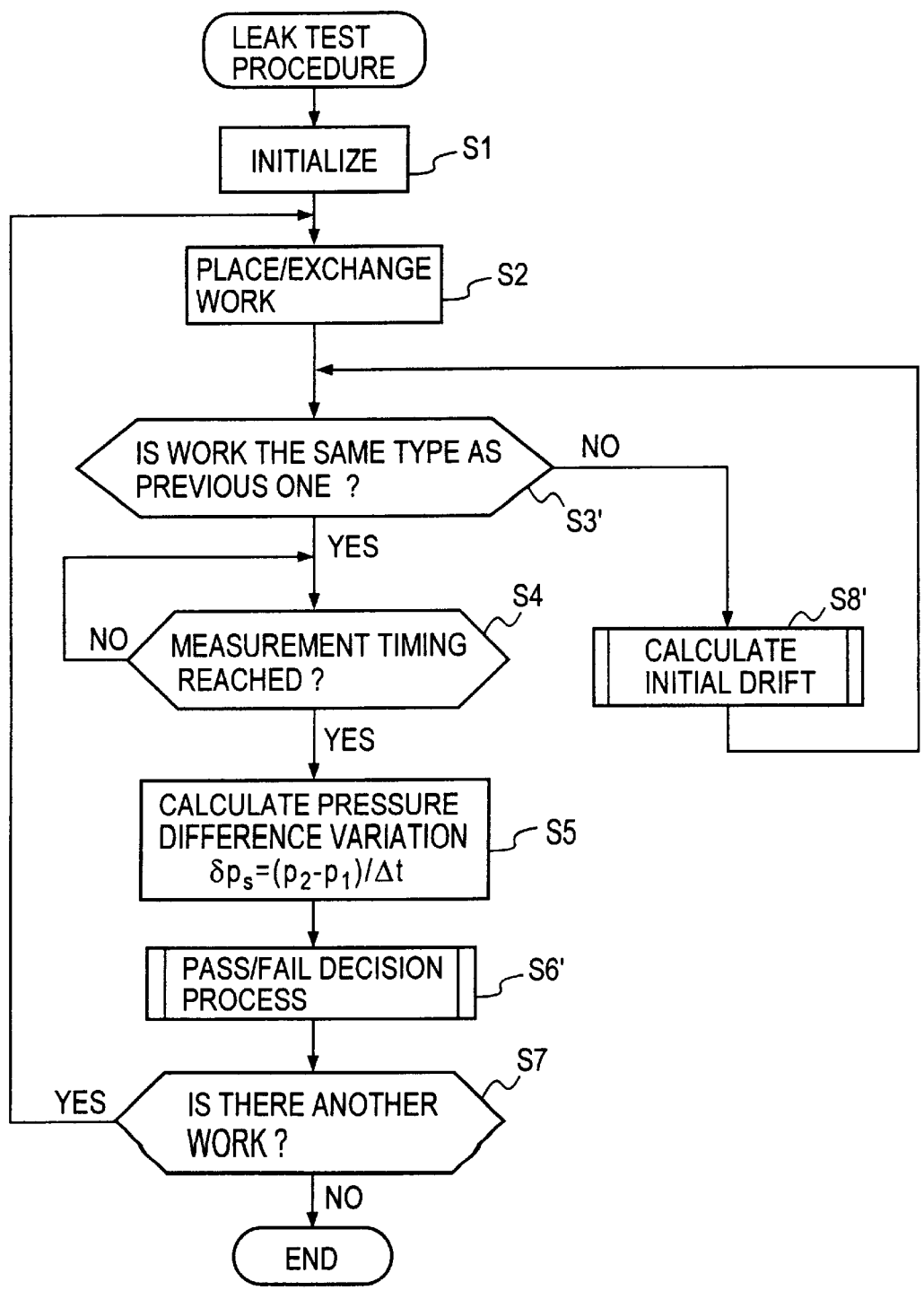
FIG. 13 is a flowchart showing a leak test procedure in a second embodiment of the present invention.
Figure 14:
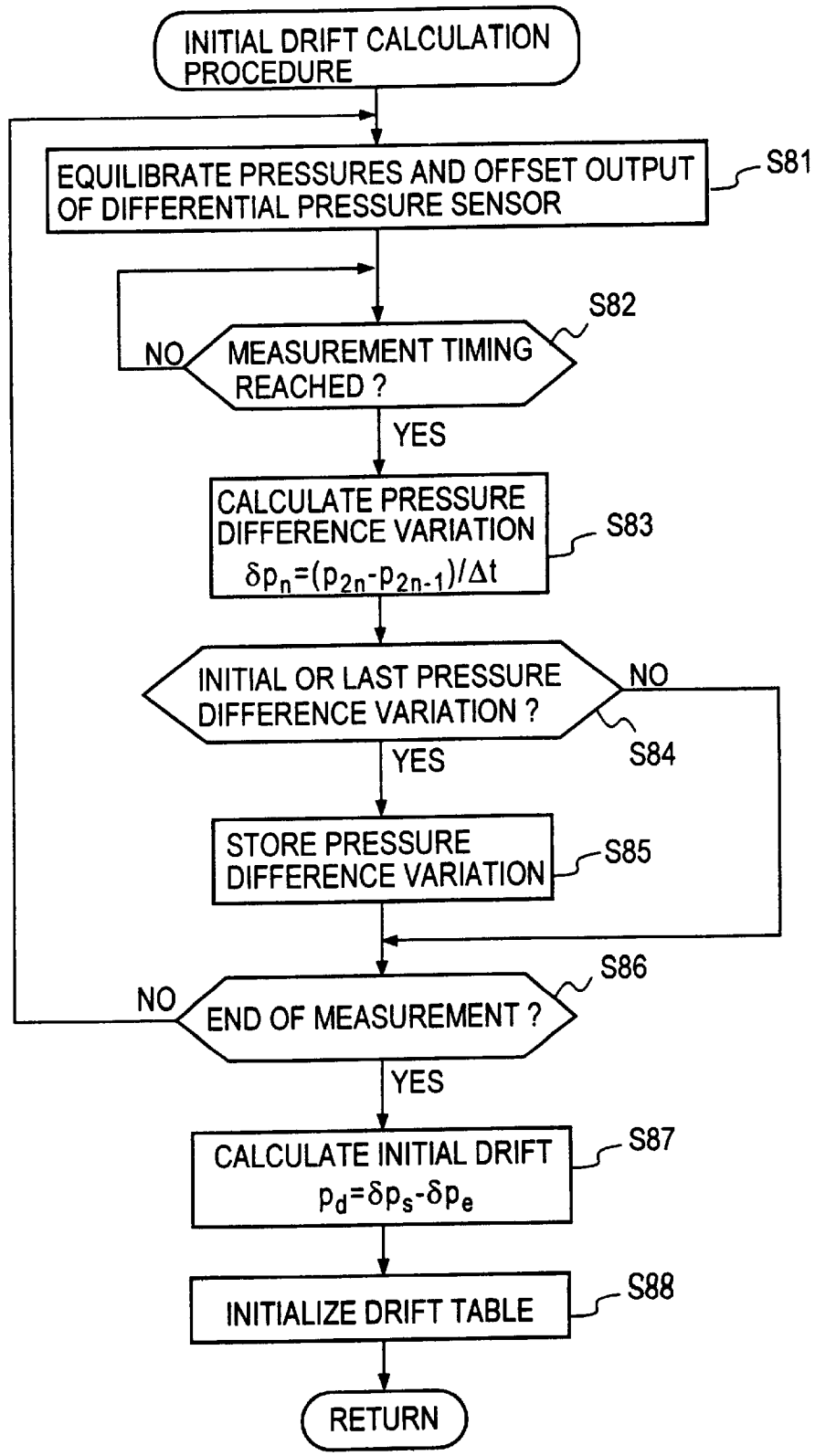
FIG. 14 is a flowchart showing an initial drift calculation procedure in the flowchart of FIG. 13.
Figure 16:
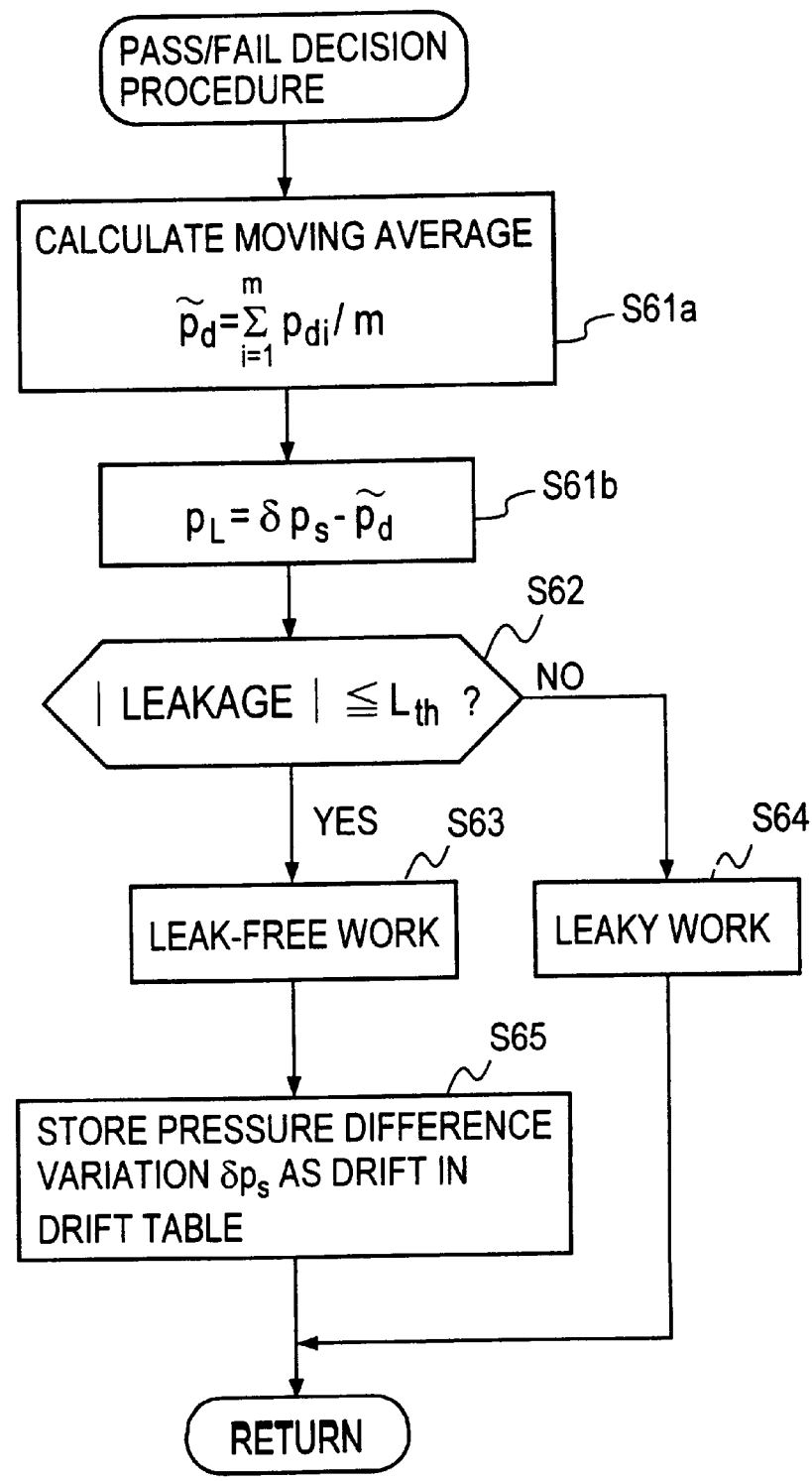
FIG. 16 is a flowchart showing pass/fail decision process in the flowchart of FIG. 13.

FIG. 13 is a flowchart showing a leak test procedure of the second embodiment based on the idea referred to above, FIG. 14 a flowchart showing an initial drift calculating process of step S8' in FIG. 13, and FIG. 16 a flowchart showing a pass/fail decision process of step S6' in FIG. 13. In these flowcharts, the same processes as those in FIGS. 6 to 8 are identified by the same reference numerals and no description will be given of them. FIG. 15 depicts an example of a drift table and FIG. 17 the range of corrected amounts of drift which are stored in the drift table. Incidentally, the pass/fail decision process depicted in FIG. 16 is a concrete form of learning means.

The leak test procedure depicted in FIG. 13 is followed in substantially the same manner as in the procedure of FIG. 6, but differs therefrom in the two points described below. First, in step S3', only when it is decided that the type of the current work under test is different from the type of the preceding work, the initial drift calculating process of step S8' is executed following the flowchart of FIG. 14. Accordingly, on a first one of works under test which are different in type from a series of preceding works, the initial drift calculating process is executed in step S8' as is the case with the first embodiment.

The other difference lies in that, in the test of a series of works of the same type, the initial pressure difference variation $\delta p_s$ measured on a work decided to be leak-free is estimated as and utilized as the initial drift at the current point in time, as depicted in FIG. 16 which is the pass/fail decision step S6' in FIG. 13. In practice, however, the work decided to be leak-free may sometimes have a leak smaller than, but close to, the reference value $L_{th}$; therefore, it will impair the reliability of data to use the estimated initial drift intact as a correction value in the measurement on the next work. As shown in FIG. 16, according to the second embodiment, estimated amount of initial drifts (i.e. initial pressure difference variations) on works decided to be free of leaks are stored one after another in the drift table and an average (a moving average) of the plurality of previous initial drifts is used to correct the initial pressure difference variation measured on the next work. These processes will be described below.

The drift calculating procedure, which is followed when the type of the work under test is changed, differs from the procedure of FIG. 8 in that the initial drift $p_d$ calculated in step S88 is used to initialize the drift table in step G88. That is, when the initial drift on a work of the type different from the preceding works has been obtained, all drift data stored in the drift table on the type of the preceding works is erased. Alternatively, a drift table for the type of the current work under test is newly created (the process for which will hereinafter be called initialization of the drift table). The initial drift $p_d$ is written as first data $d_1$ in such a drift table. The initial drift $p_d$ is derived from the difference between the initial and last pressure difference variations $\delta p_s$ and $\delta p_e$ as is the case with step S88 in FIG. 8.

In FIG. 15A, there is depicted a drift table 300, in which m pieces of drift data can be stored. The drift table 300 is provided, for example, in a predetermined area of the RAM 112 in FIG. 5. An appropriate value obtained empirically is used as the value m. The m pieces of drift data are stored in the drift table at addresses 1 to m, as depicted in FIG. 15A. On the first work after the change of the type of the work under test, the initial drift $p_d$ is obtained following the procedure of FIG. 14, and is written as the data $p_{d1}$ in the initialized drift table 300 at the address 1. On the succeeding works of the same type, the initial pressure difference variations $\delta p_s$ measured on the works decided as leak-free in the decision process of step S6', respectively, are written as estimated initial drifts $p_{d2}$, $p_{d3}$, . . . in the drift table 300.

The decision procedure of FIG. 16 differs from that of FIG. 7 in the two points described below. A first difference lies in the inclusion of [step S61a] of calculating a moving average $\tilde{p}_d$ of drift from the drift data stored in the drift table 300 and [step S61b] of calculating leakage $p_L = \delta p_s - \tilde{p}_d$ from the moving average $\tilde{p}_d$ and the initial pressure difference variation $\delta p_s$ in the measurement period obtained in step S5 in FIG. 5. The moving average $\tilde{p}_d$ mentioned herein is an average of the latest m pieces of data $p_{d1}$ to $p_{dm}$ stored in the drift table, and is given by the following equation.

$$\tilde{p}_d = \left(\sum_{i=1}^{m} p_{di}\right) / m \tag{6}$$

When the number of data is smaller than m, an average value of all data stored so far is calculated.

The other difference is the inclusion of [step S65] wherein, when the work under test is decided as leak-free (YES route of step S62), the pressure difference variation $\delta p_s$ measured on that work is estimated to be attributable only to drift and is then stored as the drift data $p_d$ in the drift table 300. In the event that m pieces of data have already written in the drift table 300, the oldest data is discarded and the latest data is written instead.

More specifically, in the leak test on the succeeding works of the same type as the work on which the initial drift $p_d$ was calculated in step S8' in FIG. 13 after the change of the type of work and written as the data $p_{d1}$ in the drift table 300, the pressure difference variation $\delta p_s$ on the work decided as leak-free for the first time is stored as the second data $p_{d2}$ in the drift table 300 as depicted in FIG. 15A. Then, the pressure difference variation $\delta p_s$ on the work decided next as leak-free is stored as the third data $p_{d3}$ in the drift table 300. Thereafter, pressure difference variations $\delta p_s$ on the next to mth-plus-one leak-free works are similarly stored as data $p_{dm}$ in the drift table 300.

After this, the second to m-th data $p_{d2}$ to $p_{dm}$ in the drift table 300 are shifted from the addresses 1 through (m−1), respectively, and the pressure difference variation $\delta p_s$ on the next leak-free work is written as an mth-plus-one data $p_{dm+1}$ in the drift table 300 at the address m as depicted in FIG. 15B.

In the second embodiment described above, the moving average $\tilde{p}_d$ of the data stored in the drift table 300 at the addresses 1 to m is calculated, and then the leakage $p_L$ is calculated from the difference between the moving average $\bar{p}_d$ and the pressure difference variation $\delta p_s$ {the third pressure difference variation}. Further, this pressure difference variation $\delta p_s$ is additionally stored in the drift table 300 when the work under test is decided to be leak-free, and it is used to update the drift value (the moving average) which is used in the next work test. Since the pressure difference variation $\delta p_s$ is susceptible to the influence of the ambient temperature change, the moving average $\bar{p}_d$ and the leakage $p_L$ also changes, accordingly. Hence, even if ambient temperature changes, it is possible to make more accurate determination whether the work under test leaks or not. Before the number of data stored in the drift table 300 reaches m, the reliability of the average drift value can be enhanced by assigning larger weights to the first drift values Pd1 derived from the difference between the pressure difference variations $\delta p_s$ and $\delta p_e$ and then by averaging such weighted first drift values, rather than by obtaining simply averaged drift value. The reason for this is as follows: The estimated amounts of drift (i.e. the pressure difference variations $\delta p_s$) on the work decided as leak-free, which are held in the drift table 300, might contain leak components within the permissible range $L_{th}$. In contrast to this, the initial drift $p_{d1} = \delta p_s - \delta p_e$, which is calculated from the initial pressure variation $\delta p_s$ and the last one $\delta p_e$ obtained a relatively long period of time thereafter on the first work after the change of the work type, represents an amount of drift with no leak components; hence, this initial drift $p_{di}$ is highly reliable.

MODIFICATIONS OF SECOND EMBODIMENT

Figures 17, 18:
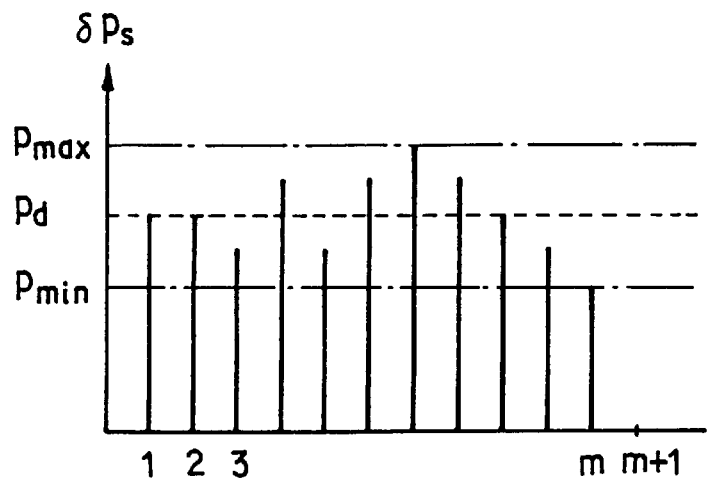
FIG. 17 is a diagram showing the range of correction results which are stored in the drift table.
FIG. 18 is a diagram depicting the relationship between temperature and drift measured for each type of work.

In the second embodiment, when the work under test is free of leaks, the pressure difference variation $\delta p_s$ is stored as an estimated drift value in the drift table 300 in step S65 in FIG. 16 so as to follow ambient temperature changes. In this instance, according to the pressure difference variation $\delta p_s$ and the moving average $\bar{p}_d$ on the current work, the pressure difference variation $\delta p_s$ of an abnormal value might be written as an estimated drift value in the drift table 300. To avoid this, the range of the pressure difference variations for storage in the drift table 300 is defined in step S65. This range is one that is defined by the upper and lower limits $p_{max}$ and $p_{min}$ with reference to the initial drift $p_d$ as depicted in FIG. 17 (which range will hereinafter be called an "allowable range").

The values $p_{max}$ and $p_{min}$ are chosen such that $(p_{max} - p_d)$ and $(p_d - p_{min})$ are smaller than the reference value $L_{th}$, and only pressure difference variations $\delta p_s$ within this allowable range are written as estimated drift values in the drift table 300. With this method, no pressure difference variations $\delta p_s$ of abnormal values will be written in the drift table 300. Consequently, only pressure difference variations $\delta p_s$ which are highly reliable as drift values are stored in the drift table 300—this provides increased reliability in the determination as to whether the work under test leaks or not.

Provision may be made so that when the pressure difference variation $\delta p_s$ outside the abovementioned allowable range is measured more than a predetermined number k of times, the process of step S8' is executed even if the decision by step S3' is YES. This is advantageous for the reason given below. That is, when the measurement operations are temporarily suspended, for example, at lunchtime or on holidays, environmental conditions often change sharply. In such an instance, previously calculated drifts $p_d$ and data stored in the drift table 300 mostly become useless.

Such forced execution of step S8' provides an initial drift $p_d$ and data $\delta p_s$ in the drift table 300 which match the current environmental conditions of measurement. Hence, even if the measurement operations are suspended, an accurate determination as to whether the pressurized gas leaks out of works under test can be made immediately after the resumption of the measurement operations.

In the second embodiment, the initial drift $p_d$ is calculated for each type of work (steps S3' and S8' in FIG. 13). In the case where initial drifts $p_d$ corresponding to air temperatures have been obtained based on the past measurement data for each of the types of work W1, W2, . . . , a table of their correspondence may be prestored in a memory, for example, as shown in FIG. 18 so that the initial drift $p_d$ corresponding to the type of the current work and air temperature is read out of the table and set in step S8' in FIG. 13.

This permits rapid setting of the initial drift $p_d$ and hence hastens the beginning of the leak test on the work to be measured.

In the case of storing the pressure difference variations $\delta p_s$ in the drift table 300 in step S65 in FIG. 16, the initial drift $p_d$ and the pressure difference variation $\delta p_s$ may be weighted according to the type of the work concerned. For example, letting weighting coefficients of works of the types W1 and W2 be represented by $w_1$ and $w_2$, respectively, the pressure difference variations $\delta p_s$ on the works of types W1 and W2 are multiplied by the weighting coefficients $w_1$ and $w_2$, respectively, and then stored in the drift table 300.

With this method, all works to be measured can be tested for leaks as usual without precalculating the initial drift $p_d$ for each type. Accordingly, works of a flexible manufacturing system can be tested for leaks in succession with high accuracy.

THIRD EMBODIMENT

In the case where pressure difference values measured on works decided as non-defective are sequentially stored and their moving average is used as a drift correction value, a highly reliable leak test can be made without a hitch when the work and master temperatures gradually vary with ambient temperature.

However, when a work still hot is tested, for example, soon after a high-temperature cleaning or welding process, the work temperature changes more rapidly than room temperature (approaches the latter). In such a situation, the moving average for use as the drift correction value cannot quickly respond to the temperature change of the work, and consequently, the test results lack reliability. In particular, when a work whose temperature is appreciably higher than room temperature is connected by a jig to a conduit, the temperature difference between the work and the jig is so great that a large quantity of heat rapidly escapes through the jig, resulting in the work temperature quickly dropping and the jig temperature gradually rising. Under such test conditions, the amount of drift of the pressure difference is considered to rapidly change depending on the temperature difference between the work and the jig as well.

In the third embodiment, the amount of drift $p_d$ is estimated not from the moving average but instead it is expressed as the following linear function of the difference between the work temperature $T_A$ and the jig temperature $T_B$:

$$P_D = K(T_A - T_B) + C \tag{7}$$

and the drift $p_d$ is estimated by Eq. (7) from the temperature difference $(T_A - T_B)$ detected on the work under test.

To obtain the constant C in Eq. (7), a drift calculating process is executed in advance under the condition that the work temperature $T_A$ and the jig temperature $T_B$ are equal. This process provides a constant $P_{D'=C=\delta ps}-\delta p_e=p_d$ on the work when $T_A=T_B$. $\delta p_s$ and $\delta p_e$ represent the initial pressure difference variation in the measurement period and the last pressure difference variation in the stabilization period (the period in which the drift can be regarded as having converged to zero) described in the first or second embodiment; hence, the latter represents the amount of leakage of the work. That is, when $T_A=T_B$, the constant $P_D'$ is the same as the initial drift $p_d$ calculated in the drift calculating process of the first and second embodiments.

Next, the work is mounted by a jig 25 (see FIG. 19) on the conduit after being heated so that the work's temperature $T_A$ is higher than the jig temperature $T_B$, and the initial pressure difference variation $\delta p_S$ is measured in the measurement period. This initial pressure difference variation $\delta P_S$ can be given by the following equation through the use of Eq. (7).

$$\delta P_S = P_D + \delta p_s \qquad (8)$$
$$= K(T_A - T_B) + C + \delta p_e$$
$$= K(T_A - T_B) + \delta p_s$$

Substituting the initial pressure difference variation $\delta p_s$ measured with $T_A=T_B$ and the initial pressure difference variation $\delta P_S$ measured with $T_A>T_B$ into Eq. 88), the proportional constant K can be calculated as given below.

$$K=(\delta P_s-\delta p_s)/(T_A-T_B) \qquad (9)$$

In this way, the constant C and the proportional constant K in Eq. 87 are determined. In the subsequent leak test mode, the detected work and jig temperatures $T_A$ and $T_B$ are used to calculate the estimated drift $P_D$ on the heated work by Eq. (7), and the estimated value is subtracted from the initial pressure difference variation $\delta p_s$ to estimate the leakage of the work.

Figure 19:
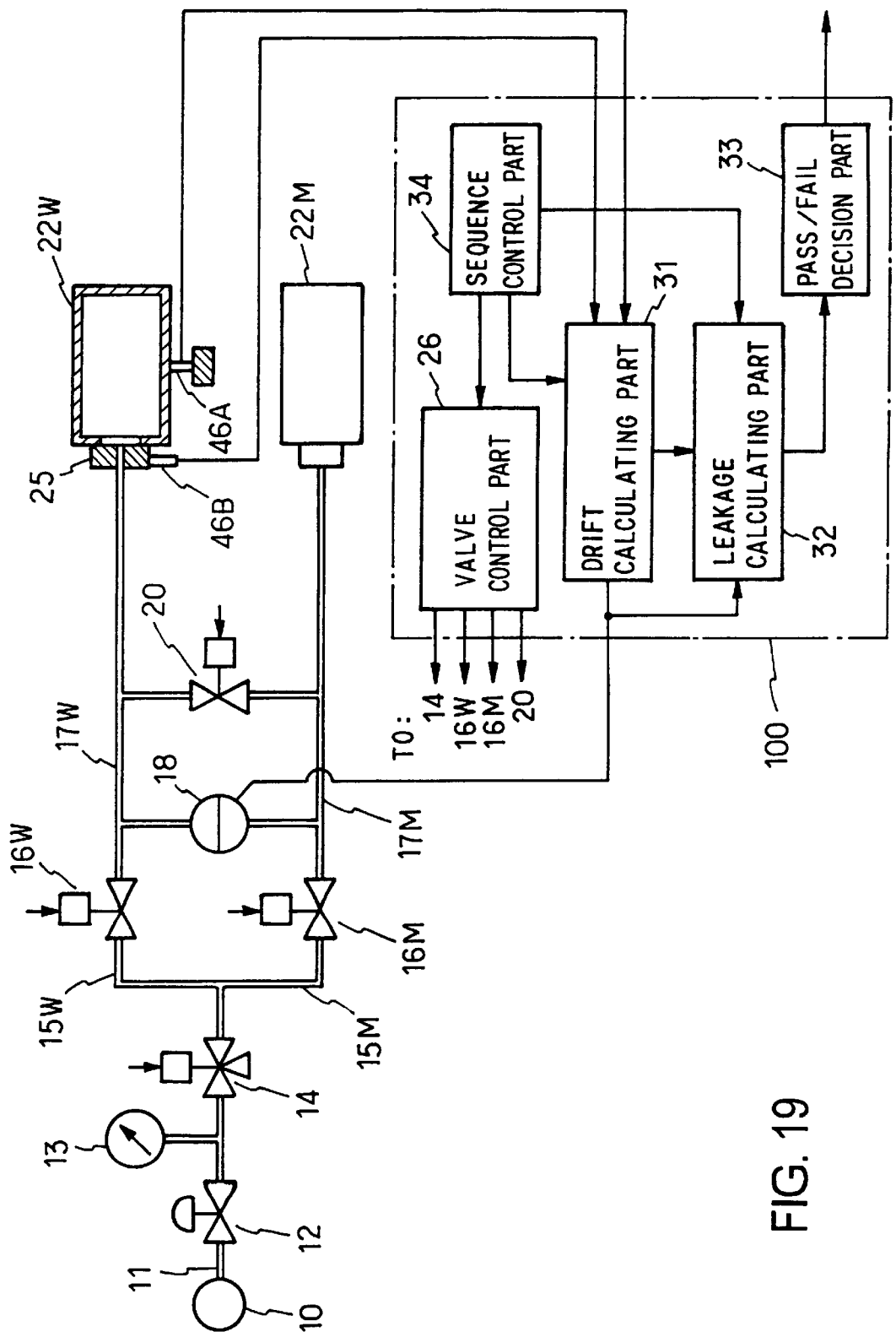
FIG. 19 is a block diagram illustrating a leak test apparatus according to a third embodiment of the present invention.

FIG. 19 illustrates the functional configuration of a leak test apparatus according to the third embodiment of the present invention. This embodiment differs from the FIG. 4 embodiment in the provision of a temperature sensor 46A for detecting the temperature $T_A$ of the work 22W and a temperature sensor 46B for detecting the temperature $T_B$ of the jig 25. The detected temperatures are provided to the drift calculating part 31. The temperature sensors 46A and 46B may each be formed, for example, by a thermocouple. The temperature sensor 46A is disposed near the jig 25 so that the work 22W placed on the jig 25 inevitably contacts the temperature sensor 46A which measures the work temperature $T_A$. The temperature sensor 46B is mounted directly on the jig 25 to measure its temperature $T_B$. The detected signals from the temperature sensors 46A and 46B are provided to the control 100 and used to calculate the drift value. The control 100 comprises the valve control part 26, the drift calculating part 31, the leakage calculating part 32, the pass/fail decision part 33, and the sequence control part 34 as in the case of the FIG. 4 embodiment. In this case, however, the process in the drift calculating part 31 is a modification of the process depicted in FIG. 8 as described later on. The control 100 is formed by a computer as is the case with FIG. 5.

Figure 20:
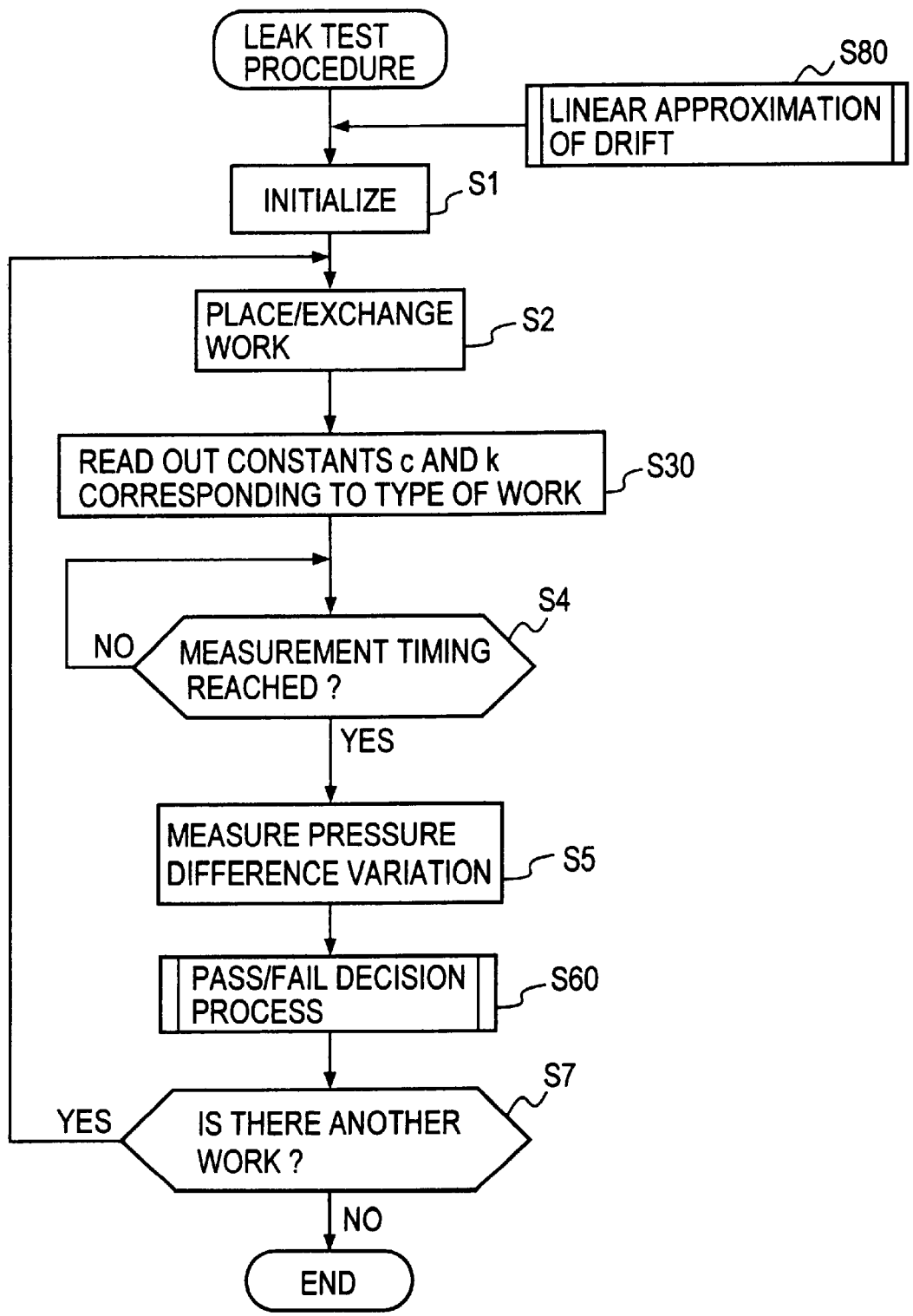
FIG. 20 is a flowchart depicting a leak test procedure in the third embodiment.

FIG. 20 is a flowchart of the leak test according to the third embodiment. This teak test procedure is basically similar to that depicted in FIG. 5 but differs therefrom in the points listed below.

(a) In step S80, as described later on with reference to FIG. 21, the constants C and K of the linear approximate expression of drift (7) are precalculated for the type of each work, and prestored in a memory.

(b) In step S30, the constants C and K of the drift linear approximate expression corresponding to the type of the work under test are read out of the memory.

Figure 22:
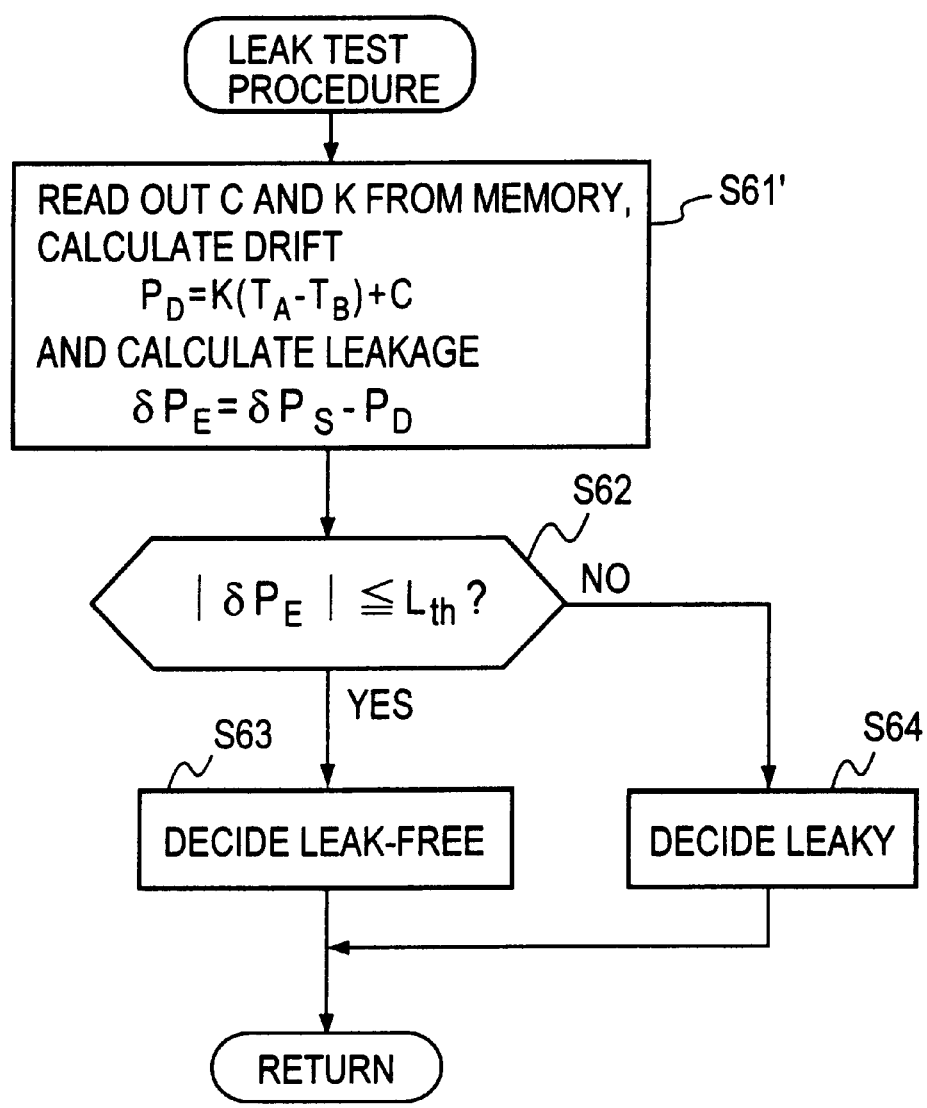
FIG. 22 is a flowchart depicting a pass/fail decision process in the flowchart of FIG. 20.

(c) In the pass/fail decision process of step S60, as described later on with respect to FIG. 22, the drift $P_D$ is calculated, as the drift to be used for calculating the amount of leakage in step S61, from the already detected work and jig temperatures $T_A$ and $T_B$ by Eq. (7), and the thus calculated drift $P_D$ is subtracted from the initial pressure difference variation $\delta P_S$ to obtain leakage $\delta P_E$.

Figure 21:
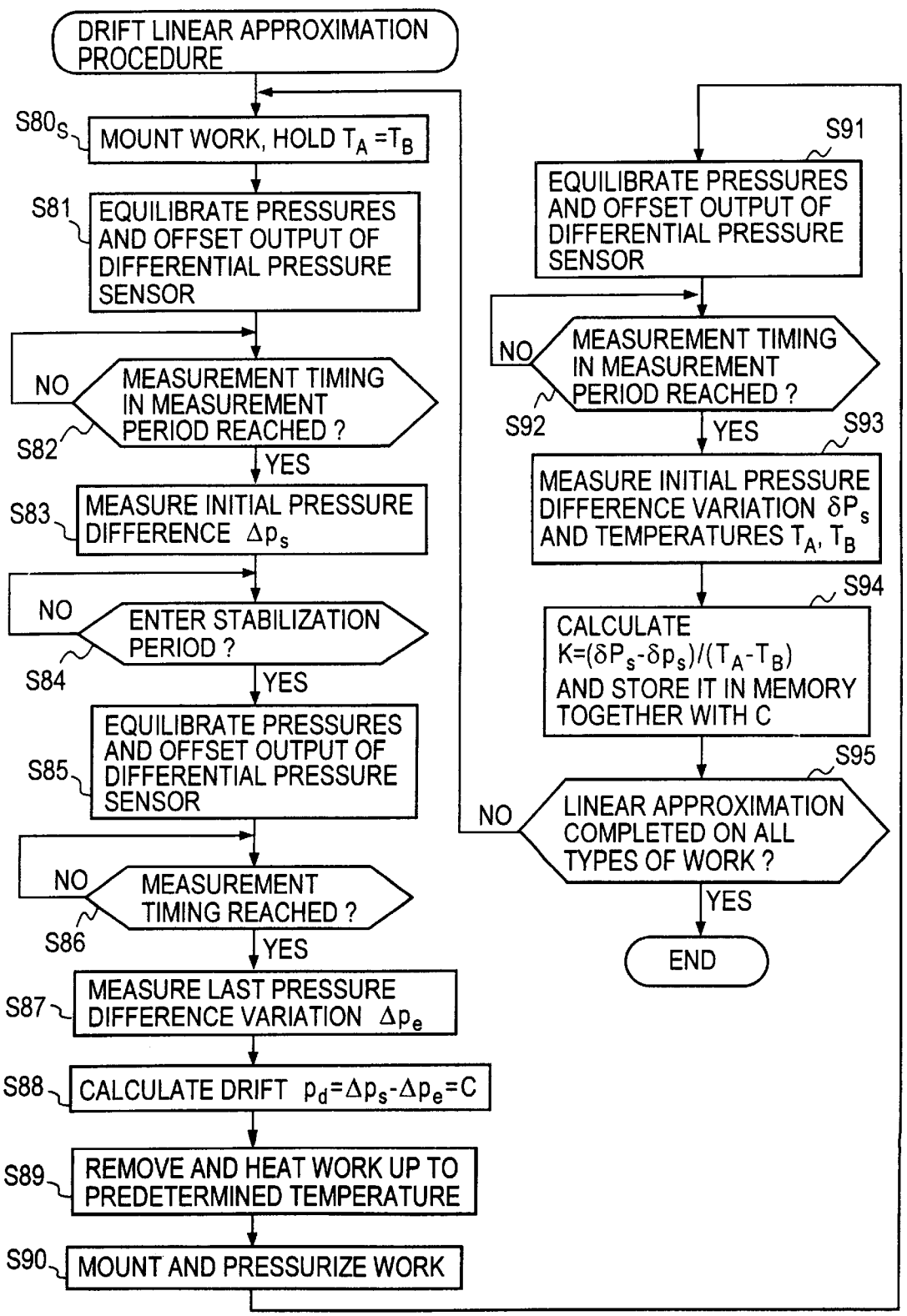
FIG. 21 is a flowchart depicting a drift linear approximation procedure in the flowchart of FIG. 20.

Turning next to FIG. 21, the drift linear approximation will be described. In the third embodiment, it is necessary to set up a linear approximate expression of drift on the type of each work in advance. In step S80s, a desired type of work held at room temperature is mounted on the jig 25. In steps S81 to S88, the initial pressure difference variation $\delta p_s$ in the measurement period (step S83) and the last pressure difference variation $\delta p_e$ in the stabilization period (step S87) are calculated on the work with the work and jig temperatures $T_A$ and $T_B$ held equal by the same processes as those of steps S81 to S88 in FIG. 12, and the drift $p_d=\delta p_s-\delta p_e$ under the condition of $T_A=T_B$ is calculated (step S88). This drift pd is defined as the constant C in Eq. (7) (under the condition $T_A=T_B$). In the next step S89, the work is demounted from the jig 25, then heated up to a desired temperature, and mounted again on the jig, followed by introducing pressurized gas into the work and master up to a desired pressure. In steps S91 to S93 the initial pressure difference variation $\delta p_s$ under the condition $T_A \neq T_B$ is calculated, and the work and jig temperatures $T_A$ and $T_B$ at that time are measured. In step S94 the constant K is determined by Eq. (7) from the initial pressure difference $\delta p_s$ under the condition $T_A=T_B$, the initial pressure variation $\delta P_S$ under the condition $T_A \neq T_B$ and the measured temperatures $T_A$ and $T_B$, and the constants C and K are stored in a memory in correspondence with the type of the work. In step S95, a check is made to see if the linear approximation of drift has been completed on all types of works, and if not completed, then the procedure returns to step S80; if completed, the drift linear approximation procedure ends. The processes of steps S1, S2, S4, S5, and S7 in FIG. 20 are the same processes as in the first embodiment of FIG. 6. In the third embodiment, the linear approximate expression of drift (7) is set up in advance on every type of work to be tested for leaks and its constants C and K are prestored in a memory in correspondence with each type of work in step S80 as described above. To obtain the linear approximate expression of the drift of each work, the initial pressure difference variation $\delta p_s$ in the measurement period and the last pressure difference variation $\delta p_e$ the stabilization period are calculated with the work and jig temperatures $T_A$ and $T_B$ held nearly equal by the same processes as in FIG. 8,12, or 14 and the difference $p_d=\delta p_s-\delta p_e=C$ is calculated. Next, the work is heated up to a desired temperature ($T_A>T_B$) and mounted on the jig, followed by measuring the initial pressure difference variation $\delta P_S$ in the measurement period and then calculating the constant K from Eq. (9) using the initial pressure difference variation $\delta p_s$ measured when $T_A=T_B$.

In the leak test mode (steps S1, S2, S30, S4, S5, S60, and S7) in FIG. 20, the type of the work mounted on the jig 25 is detected and the corresponding constants C and K are read out of the memory in step S30. This process may be performed in the pass/fail decision step S60. In the pass/fail decision process of step S60, as depicted in FIG. 22, the drift $P_D$ is calculated by Eq. (7) from the constants C and K read out in step S30 and the measured current work and jig temperatures $T_A$ and $T_B$. Then, the initial pressure difference variation $\delta p_s$ measured in step S5 is used to calculate the leakage $\delta P_E$ by the following equation (step S61).

$$\delta P_E = \delta p_s - P_D \tag{10}$$

Following this, the absolute value of the leakage $\delta P_E$ is compared with the reference value $L_{th}$ (step S62). If the former is smaller than the latter, the work under test is decided to be free of leaks (step S63), but if the former is larger than the latter, the work is decided to be leaky (step S64).

While the first, second and third embodiments have been described to introduce high-pressure gas into the work 22W and the master 22M to test the work for leaks, it is evident that the present invention is also applicable to a leak test in which the work 22W and the master 22M are evacuated of gas by means of a pressure reducing pump to test for leaks into the work 22W from outside.

EFFECTS OF THE INVENTION

As described above, according to the first embodiment of the present invention, the pressure difference variation is measured at least twice in the drift calculation process. Each measurement is carried out after a pressure equilibrium is established between the work and master prior to the closing of the valve 20. This makes smaller the step size of variation of the pressure difference to be measured than in the prior art, and hence allows the use of a high-sensitivity differential pressure sensor. Consequently, the value of drift that is obtained by subtracting the second pressure difference variation from the first one becomes accurate accordingly. The calculation of the drift does not require the use of a leak-free, non-defective work but can be made using a given work. In the second embodiment of the present invention, the initial pressure difference variation $\delta p_s$ measured on the work decided to be leak-free is stored as an estimated drift value in the drift table, and a moving average of the data stored in the drift table is used as the drift value of the next work. This provides a drift value that follows a temperature change, and hence makes it possible to more accurately determine whether the work leaks or not, irrespective of a temperature change or the like.

In the third embodiment of the present invention, the drift is regarded as a linear function of the difference between the work and jig temperatures and its linear approximate expression is obtained in advance on every type of work. By calculating the drift of a heated or cooled work from the linear approximate expression and using the drift for calculation of the leakage, the work of a given temperature can be tested for leaks. In the case of setting up this linear approximate expression of drift, the initial drift is measured under the condition that the work and jig temperatures are equal, as is the case with the first embodiment. That is, the measurement of either of the first and second pressure difference variations is immediately preceded by opening the valve 20 to establish a pressure equilibrium between the work and the master. This provides a highly accurate value of drift.

What is claimed is:

1. A leak test method in which: pressurized gas is introduced into a master and a work connected to a high-pressure gas source via first and second valves, respectively; the pressure difference between said master and said work is measured by a differential pressure sensor; a pressure difference variation per unit time is calculated from a measured value of said pressure difference; a drift is subtracted from said pressure difference variation to obtain a leakage; and said leakage is compared with a leakage reference value to determine if said pressurized gas leaks out from said work; said method comprising the steps of:
   (a) opening a third valve connected between said work and said master to establish a pressure equilibrium therebetween, and then closing said third valve;
   (b) measuring a first pressure difference variation per unit time;
   (c) opening said third valve, after said step (b), to establish a pressure equilibrium between said master and said work, and then closing said third valve;
   (d) measuring a second pressure difference variation per unit time after said step (c), wherein: said first and second pressure difference variations are measured in a measurement period which is an initial pressure difference variation domain;
   (e) obtaining an exponential approximate expression of time from said first and second pressure difference variations; and
   (f) calculating a pressure difference variation as a pressure difference stabilization period subtracting said pressure difference variation from said first pressure difference variation to obtain said drift.

2. The method of claim 1, wherein said first pressure difference variation is measured in a measurement period which is an initial pressure difference variation domain, and said second pressure difference variation is measured in a stabilization period which is a pressure difference stabilization domain.

3. The method of claim 1, wherein said measurements of said first and second pressure difference variations in said steps (b) and (d) obtain, as pressure difference variations, the differences between a first pressure difference measured at a first time after the closing of said third valve and a second pressure difference measured at a second time a predetermined time $\Delta t$ after said first time in said steps (a) and (c).

4. The method of claim 1, wherein the time for closing said third valve in each of said steps (a) and (c) is set at a point in time after the lapse of time necessary for changes in said pressure difference to substantially settle after the closing of said third valve.

5. The method of any one of claims 1 to 4, wherein said drift in said step (e) is obtained as the difference between said first and second pressure difference variations.

6. The method of any one of claims 1 to 4, wherein the same measurement as that for measuring said pressure difference variation by a combination of said steps (a) and (b) is repeated N times, N being an integer equal to or greater than 2, and pressure difference variations by first and N-th measurements are obtained as said first and second pressure difference variations, respectively.

7. The method of claim 1, further comprising the steps of:
   (f) making a check to see if the type of work is changed;
   (g) if so, executing a drift calculating process by said steps (a) to (e), and writing the resulting drift as an initial drift into a drift table;
   (h) if the type of work is not changed, a moving average of latest pieces of drift data stored in said drift table is calculated as an estimated drift;
   (i) measuring a third pressure difference variation in a measurement period which is an initial pressure difference variation domain, and calculating the difference between said third pressure difference variation and said estimated drift;

(j) comparing the absolute value of said difference with a leakage reference value, and deciding said work to be leak-free or leaky depending on whether said absolute value is smaller or larger than said reference value; and (k) writing said third pressure difference variation on said work decided to be leak-free as the latest drift into said drift table.

8. The method of claim 7, wherein said moving average is obtained by assigning larger weights to said initial drifts obtained by said drift calculating process and subjecting them to weighted averaging.

9. The method of claim 7, wherein said third pressure difference variation to be written in said drift table is only one that falls in a range smaller than said leakage reference value.

10. The method of claim 7, wherein said calculated initial drift is stored in a memory in correspondence with the type and temperature of a work at that time, and when it is decided that the type of said work is changed, an initial drift corresponding to the type of said work is read out and used.

11. The method of claim 1, wherein a drift $P_D$ is expressed by the following linear approximate expression of the difference between the temperature $T_A$ of said work and the temperature $T_B$ of a jig for connecting said work to a conduit:

$$P_D = K(T_A - T_B) + C$$

where said C and K are constant; and wherein said drift calculating process by steps (a) to (e): premeasures, on the type of each work, said first and second pressure difference variations $\delta p_s$ and $\delta p_e$ under the condition $T_A = T_B$ in a measurement period which is an initial pressure difference variation domain and a stabilization period which is a pressure difference stabilization domain, respectively, and calculating, as said constant C, an initial drift $p_d$ which is the difference between said first and second pressure difference variations;

heats said each work up to a desired temperature $T_A \neq T_B$, then measures a third pressure difference variation $\delta P_S$, then calculate $$K = (\delta P_S - \delta p_s)/(T_A = T_B)$$

from the temperature difference $(T_A - T_B)$ at that time and said third pressure difference variation $\delta P_S$, and stores said constants C and K in a memory in correspondence with the type of said each work;

said method further comprising the steps of:

(f) in a leak test mode, reading out of said memory said constants C and K corresponding to the type of a work under test, and calculating drift $P_D$ by said linear approximate expression from the temperatures of said work and said jig at that time;

(g) measuring a fourth pressure difference variation in said measurement period; and (h) a correction result, obtained by subtracting said drift $P_D$ from said fourth pressure difference variation, with said leakage reference value, and deciding said work to be leak-free or leaky depending on whether said correction result is smaller or larger than said leakage reference value.

12. A differential pressure type leak test apparatus for testing a work for leaks based on variations in the pressure difference between said work and a master, said apparatus comprising:

a high-pressure gas source;

first and second conduits for interconnecting said high-pressure gas source and said work and said master through first and second valves, respectively;

a third valve connected between said first and second conduits, for permitting and inhibiting the passage therethrough of gas between said master and said work;

a differential pressure sensor connected between said first and second conduits, for detecting the pressure difference between said master and said work;

a sequence control part which generates a time sequence for opening, and closing of said first, second and third valves and a time sequence for detecting said pressure difference by said differential pressure sensor in a drift calculating mode and in a leak test mode;

a valve control part placed under the control of said time sequence by said sequence control part, which, in said drift calculating mode, opens said first and second valves to introduce therethrough high-pressure gas into said work and said master from said high-pressure gas source and, prior to measuring first and second pressure difference variations, opens said third valve to establish a pressure equilibrium between said work and said master, and thereafter closes said third valve and which, in said leak test mode, opens said first and second valves to introduce therethrough high-pressure gas into said work and said master from said high-pressure gas source and, prior to measuring a third pressure difference variation, opens said third valve to establish a pressure equilibrium between said work and said master and thereafter closes said third valve;

a drift calculating part placed under sequence control by said sequence control part, which, in said drift calculating mode, executes in said first and second pressure difference variation measurements a process of obtaining first and second pressure difference variations by detecting pressure differences at a first time after the closing of said third valve and at a second time a predetermined time after said first time and calculates a drift from said first and second pressure difference variations;

a leakage calculating part placed under sequence control by said sequence control part, which, in said leak test mode, obtains a third pressure difference variation by detecting pressure differences at the first time after the closing of said third valve and at the second time a predetermined time after said first time and subtracts said drift from said third pressure difference variation to obtain the leakage from said work; and a pass/fail decision part which compares said leakage with a leakage reference value and decides that said work is leak-free or leaky, depending on whether said leakage is smaller or larger than said leakage reference value.

13. The leak test apparatus of claim 12, which further comprises a drift table in which said drift calculated by said drift calculating part is written and said third pressure difference variation of said work decided by said pass/fail decision part to be leak-free is written as a drift, and wherein said leakage calculating part uses a moving average of drifts in said drift table as said drift for correcting said third pressure difference variation.

14. The leak test apparatus of claim 12, which further comprises a first temperature sensor for measuring the temperature $T_A$ of said work under test, and a second temperature sensor for detecting the temperature $T_B$ of a jig for connecting said work to said test apparatus, wherein said drift calculating part: expresses said drift by a linear approximate expression $P_D=K(T_A\neq T_B)+C$; calculates said drift as a constant C from first and second pressure difference variations $\delta p_s$ and $\delta p_e$ measured under the condition $T_A=T_B$; heats said work up to a temperature $T_A\neq T_B$; measures an initial pressure difference variation $\delta P_s$; calculates a proportional constant K in said linear approximate expression by $K=(\delta P_S-\delta p_s)/(T_A-T_B)$; stores said constants C and K in a memory; in said leak test mode, reads out of said memory said constants C and K corresponding to the type of said work under test, then detects said temperatures $T_A$ and $T_B$ of said work under test and said jig, and calculates an estimated drift $P_D$ by said linear approximate expression; and wherein said leakage calculating part subtracts said estimated drift from said measured initial pressure difference variation $\delta P_S$ to obtain said leakage.

15. A leak test method in which: pressurized gas is introduced into a master and a work connected to a high-pressure gas source via first and second valves, respectively; the pressure difference between said master and said work is measured by a differential pressure sensor; a pressure difference variation per unit time is calculated from a measured value of said pressure difference; a drift is subtracted from said pressure difference variation to obtain a leakage; and said leakage is compared with a leakage reference value to determine if said pressurized gas leaks out from said work; said method comprising the steps of:

(a) opening a third valve connected between said work and said master to establish a pressure equilibrium therebetween, and then closing said third valve;

(b) measuring a first pressure difference variation per unit time;

(c) opening said third valve, after said step (b), to establish a pressure equilibrium between said master and said work, and then closing said third valve;

(d) measuring a second pressure difference variation per unit time after said step (c);

(e) calculating said drift from said first and second pressure difference variations checking to see if the type of said work currently under test is different from the type of the previously tested work; and (f) checking to see if a change in the temperature of said current work is larger than a reference value; wherein if the result of at least one of said checks is affirmative, a drift calculating process by said steps (a) to (e) is executed; and if the results of both of said checks are not affirmative, measuring a pressure difference variation of said work under test as a third pressure difference variation in said measurement period, and subtracting said drift from said third pressure difference variation, comparing the absolute value of the result of said subtraction with a leakage reference value, and deciding if the work under test is leaky or leak-free depending upon whether said absolute value is larger or smaller than said leakage reference value.

16. A leak test method in which: pressurized gas is introduced into a master and a work connected to a high-pressure gas source via first and second valves, respectively; the pressure difference between said master and said work is measured by a differential pressure sensor; a pressure difference variation per unit time is calculated from a measured value of said pressure difference; a drift is subtracted from said pressure difference variation to obtain a leakage; and said leakage is compared with a leakage reference value to determine if said pressurized gas leaks out from said work; said method comprising the steps of:

(a) opening a third valve connected between said work and said master to establish a pressure equilibrium therebetween, and then closing said third valve;

(b) measuring a first pressure difference variation per unit time;

(c) opening said third valve, after said step (b), to establish a pressure equilibrium between said master and said work, and then closing said third valve;

(d) measuring a second pressure difference variation per unit time after said step (c); and (e) calculating said drift from said first and second pressure difference variations wherein said measurements of said first and second pressure difference variations in said steps (b) and (d) are performed, in said steps (a) and (c), by closing said third valve, then resetting the reading of said first detected pressure difference value at said first time, and obtaining, as said pressure difference variations, said second detected pressure difference value at second time a predetermined time $\Delta t$ after said first time.

* * * * *